United States Patent
Downs et al.

(10) Patent No.: US 9,993,978 B2
(45) Date of Patent: Jun. 12, 2018

(54) SYSTEMS AND METHOD FOR PRODUCING THREE-DIMENSIONAL ARTICLES FROM FLEXIBLE COMPOSITE MATERIALS

(71) Applicant: Cubic Tech Corporation, Mesa, AZ (US)

(72) Inventors: Roland Joseph Downs, Mesa, AZ (US); Christopher Michael Adams, Mesa, AZ (US); Jon Michael Holweger, Queen Creek, AZ (US)

(73) Assignee: CUBIC TECH CORPORATION, Mesa, AZ (US)

( * ) Notice: Subject to any disclaimer, the term of this patent is extended or adjusted under 35 U.S.C. 154(b) by 112 days.

(21) Appl. No.: 14/791,025

(22) Filed: Jul. 2, 2015

(65) Prior Publication Data

US 2016/0001472 A1 Jan. 7, 2016

Related U.S. Application Data

(63) Continuation of application No. 14/076,201, filed on Nov. 9, 2013, now Pat. No. 9,114,570.

(Continued)

(51) Int. Cl.
*B29C 70/20* (2006.01)
*B29C 43/12* (2006.01)
(Continued)

(52) U.S. Cl.
CPC ........ *B29C 70/205* (2013.01); *A43B 23/0225* (2013.01); *A43B 23/0235* (2013.01);
(Continued)

(58) Field of Classification Search
CPC . B29C 66/004; B29C 66/344; B29C 66/4326; B29C 66/4332; B29C 37/0075;
(Continued)

(56) References Cited

U.S. PATENT DOCUMENTS

| 1,287,945 A | | 12/1918 | Ford |
| 2,232,640 A | * | 2/1941 | Schwartzman ....... B29C 65/743 156/251 |

(Continued)

FOREIGN PATENT DOCUMENTS

| CN | 1727571 | 2/2006 |
| CN | 101723067 | 6/2010 |

(Continued)

OTHER PUBLICATIONS

USPTO; Final Office Action dated Nov. 25, 2015 in U.S. Appl. No. 14/031,040.

(Continued)

*Primary Examiner* — Atul P. Khare
(74) *Attorney, Agent, or Firm* — Snell & Wilmer L.L.P.

(57) ABSTRACT

The present disclosure encompasses three-dimensional articles comprising flexible-composite materials and methods of manufacturing said three-dimensional articles. More particularly, the present system relates to methods for manufacturing seamless three-dimensional-shaped articles usable for such finished products as airbags/inflatable structures, bags, shoes, and similar three-dimensional products. A preferred manufacturing process combines composite molding methods with specific precursor materials to form fiber-reinforced continuous shaped articles that are flexible and collapsible.

9 Claims, 22 Drawing Sheets

Related U.S. Application Data

(60) Provisional application No. 61/724,375, filed on Nov. 9, 2012, provisional application No. 61/780,312, filed on Mar. 13, 2013, provisional application No. 61/800,452, filed on Mar. 15, 2013.

(51) Int. Cl.

| | | |
|---|---|---|
| B32B 5/12 | (2006.01) | |
| B32B 1/04 | (2006.01) | |
| B32B 38/00 | (2006.01) | |
| B32B 5/02 | (2006.01) | |
| B29C 65/78 | (2006.01) | |
| B29C 65/00 | (2006.01) | |
| B29C 55/02 | (2006.01) | |
| B32B 5/04 | (2006.01) | |
| B29C 37/00 | (2006.01) | |
| B29D 35/00 | (2010.01) | |
| A43B 23/02 | (2006.01) | |
| B29C 70/34 | (2006.01) | |
| A43B 23/04 | (2006.01) | |
| B32B 5/26 | (2006.01) | |
| B29C 33/76 | (2006.01) | |
| B29C 35/02 | (2006.01) | |
| B29C 43/00 | (2006.01) | |
| B29C 43/20 | (2006.01) | |
| B32B 37/18 | (2006.01) | |
| B29D 35/14 | (2010.01) | |
| B29C 53/60 | (2006.01) | |
| B29K 105/12 | (2006.01) | |
| B29K 105/00 | (2006.01) | |
| B29L 31/30 | (2006.01) | |
| B29L 31/50 | (2006.01) | |
| B29L 31/00 | (2006.01) | |

(52) U.S. Cl.
CPC ............ *A43B 23/042* (2013.01); *B29C 33/76* (2013.01); *B29C 35/02* (2013.01); *B29C 37/0078* (2013.01); *B29C 43/003* (2013.01); *B29C 43/12* (2013.01); *B29C 43/203* (2013.01); *B29C 55/023* (2013.01); *B29C 65/7832* (2013.01); *B29C 66/004* (2013.01); *B29C 66/022* (2013.01); *B29C 66/432* (2013.01); *B29C 66/547* (2013.01); *B29C 70/20* (2013.01); *B29C 70/202* (2013.01); *B29C 70/345* (2013.01); *B29D 35/00* (2013.01); *B29D 35/0054* (2013.01); *B29D 35/0063* (2013.01); *B29D 35/146* (2013.01); *B32B 1/04* (2013.01); *B32B 5/02* (2013.01); *B32B 5/022* (2013.01); *B32B 5/028* (2013.01); *B32B 5/04* (2013.01); *B32B 5/12* (2013.01); *B32B 5/26* (2013.01); *B32B 37/18* (2013.01); *B32B 38/0012* (2013.01); *B29C 53/60* (2013.01); *B29K 2105/12* (2013.01); *B29K 2105/256* (2013.01); *B29L 2031/30* (2013.01); *B29L 2031/505* (2013.01); *B29L 2031/768* (2013.01); *B32B 2260/023* (2013.01); *B32B 2260/046* (2013.01); *B32B 2262/0269* (2013.01); *B32B 2262/103* (2013.01); *B32B 2262/106* (2013.01); *B32B 2307/7265* (2013.01); *B32B 2307/734* (2013.01); *B32B 2307/748* (2013.01); *B32B 2437/02* (2013.01); *B32B 2571/00* (2013.01); *B32B 2605/00* (2013.01); *Y10T 156/1002* (2015.01); *Y10T 156/1051* (2015.01); *Y10T 156/14* (2015.01); *Y10T 428/19* (2015.01); *Y10T 428/24074* (2015.01); *Y10T 428/24628* (2015.01); *Y10T 442/614* (2015.04)

(58) Field of Classification Search
CPC ............ B29C 37/0078; B29L 2022/00; B29L 2022/02; B29L 2022/027
USPC ................................. 156/289, 290
See application file for complete search history.

(56) References Cited

U.S. PATENT DOCUMENTS

| | | | | |
|---|---|---|---|---|
| 2,522,346 | A | * | 9/1950 | Carson .................... B29C 53/36 138/128 |
| 2,584,632 | A | * | 2/1952 | Southwick, Jr. ........ B29C 65/02 156/289 |
| 2,679,194 | A | * | 5/1954 | Ehrenfried ............ B29C 66/004 156/289 |
| 2,748,048 | A | * | 5/1956 | Russell .................... B29C 70/26 156/197 |
| 3,335,045 | A | * | 8/1967 | Post ...................... A47C 27/081 156/289 |
| 3,644,165 | A | | 2/1972 | Chen |
| 4,475,976 | A | * | 10/1984 | Mittelstadt ............ B29C 70/342 100/211 |
| 4,565,714 | A | | 1/1986 | Koshar |
| 4,588,538 | A | | 5/1986 | Chung et al. |
| 4,637,851 | A | | 1/1987 | Ueno |
| 4,679,519 | A | | 7/1987 | Linville |
| 4,708,080 | A | | 11/1987 | Conrad |
| 4,757,742 | A | | 7/1988 | Mazelsky |
| 4,762,751 | A | | 8/1988 | Girgis et al. |
| 4,803,029 | A | * | 2/1989 | Iversen ............... B29C 37/0075 156/289 |
| 4,806,400 | A | | 2/1989 | Sancktar |
| 4,991,317 | A | | 2/1991 | Lakic |
| 5,001,003 | A | | 3/1991 | Mahr |
| 5,025,575 | A | * | 6/1991 | Lakic ................... A41D 19/001 36/29 |
| 5,094,883 | A | | 3/1992 | Muzzy et al. |
| 5,106,568 | A | | 4/1992 | Honka |
| 5,123,987 | A | * | 6/1992 | Mattia ................. B29C 65/7894 156/230 |
| 5,167,876 | A | | 12/1992 | Lem |
| 5,173,138 | A | | 12/1992 | Blauch |
| 5,279,879 | A | | 1/1994 | Takezawa |
| 5,292,475 | A | * | 3/1994 | Mead .................... B29C 37/005 264/257 |
| 5,333,568 | A | | 8/1994 | Meldner et al. |
| 5,403,641 | A | | 4/1995 | Linville et al. |
| 5,419,726 | A | * | 5/1995 | Switlik .................... B63B 35/58 114/345 |
| 5,470,632 | A | | 11/1995 | Meldner et al. |
| 5,514,431 | A | * | 5/1996 | Shimomura ............ B29C 65/02 156/244.11 |
| 5,591,933 | A | | 1/1997 | Li et al. |
| 5,648,109 | A | * | 7/1997 | Gutowski ............. B29C 51/085 156/212 |
| 5,729,834 | A | * | 3/1998 | Sloot ...................... A41D 27/08 156/276 |
| 5,922,161 | A | | 7/1999 | Wu et al. |
| 5,940,991 | A | | 8/1999 | Cabalquinto |
| 6,014,823 | A | | 1/2000 | Lakic |
| 6,048,622 | A | | 4/2000 | Hagood |
| 6,071,834 | A | | 6/2000 | Martz |
| 6,168,855 | B1 | | 1/2001 | Cohen |
| 6,224,951 | B1 | | 5/2001 | Centanni et al. |
| 6,361,642 | B1 | | 3/2002 | Bellamy et al. |
| 6,454,893 | B1 | * | 9/2002 | McKague, Jr. ......... B29C 70/12 156/166 |
| 6,565,944 | B1 | | 5/2003 | Hartness |
| 6,627,034 | B1 | * | 9/2003 | Ufer ...................... B32B 7/06 156/252 |
| 6,761,795 | B2 | | 7/2004 | Chapuis et al. |
| 6,846,548 | B2 | | 1/2005 | Harpell et al. |

(56) References Cited

U.S. PATENT DOCUMENTS

| | | | |
|---|---|---|---|
| 7,156,787 B2 | 1/2007 | Kemery et al. | |
| 7,226,878 B2 | 6/2007 | Wagner et al. | |
| 7,601,416 B2 | 10/2009 | Palley | |
| 7,622,014 B2 * | 11/2009 | Millette | A43B 13/203 156/267 |
| 7,892,374 B2 * | 2/2011 | Pekar | B29C 65/18 156/228 |
| 7,943,076 B1 * | 5/2011 | Hawkins | B29C 70/30 156/196 |
| 7,950,676 B2 * | 5/2011 | Goldsmith | A43B 5/1625 280/11.12 |
| 7,985,463 B2 | 7/2011 | Stowell et al. | |
| 8,080,487 B2 | 12/2011 | Gardner et al. | |
| 8,147,644 B2 * | 4/2012 | Tippins | B29C 66/83413 156/192 |
| 8,256,019 B2 | 9/2012 | Ardiff et al. | |
| 8,343,574 B2 | 1/2013 | Downs et al. | |
| 8,540,838 B2 * | 9/2013 | Millette | A43B 13/203 156/267 |
| 8,572,786 B2 | 11/2013 | Davis et al. | |
| 8,632,653 B2 * | 1/2014 | Brown | B29C 70/342 156/196 |
| 8,673,102 B2 * | 3/2014 | Kemery | A63B 26/003 156/242 |
| 8,784,968 B2 | 7/2014 | Adams et al. | |
| 8,802,189 B1 | 8/2014 | Downs et al. | |
| 9,079,218 B2 | 7/2015 | Downs et al. | |
| 9,114,570 B2 | 8/2015 | Downs et al. | |
| 9,154,593 B1 | 10/2015 | Meldner | |
| 9,198,477 B2 * | 12/2015 | Davis | A43B 23/029 |
| 9,339,842 B2 | 5/2016 | Downs et al. | |
| 9,358,755 B2 | 6/2016 | Adams et al. | |
| 9,630,390 B2 * | 4/2017 | Brown | B29C 70/342 |
| 2002/0182955 A1 | 12/2002 | Weglewski et al. | |
| 2003/0022578 A1 | 1/2003 | Lubker, II | |
| 2003/0064188 A1 | 4/2003 | Patel et al. | |
| 2004/0012118 A1 | 1/2004 | Perez | |
| 2004/0084138 A1 | 5/2004 | Henke et al. | |
| 2004/0102125 A1 | 5/2004 | Morman et al. | |
| 2004/0171321 A1 | 9/2004 | Plant | |
| 2005/0112968 A1 | 5/2005 | Panse | |
| 2006/0191427 A1 | 8/2006 | Geddes et al. | |
| 2006/0249868 A1 * | 11/2006 | Brown | B29C 70/342 264/163 |
| 2007/0184263 A1 | 8/2007 | Rodewald et al. | |
| 2007/0278155 A1 | 12/2007 | Lo et al. | |
| 2008/0081171 A1 | 4/2008 | DuPont | |
| 2008/0116043 A1 | 5/2008 | Chahal et al. | |
| 2008/0230173 A1 | 9/2008 | Cho et al. | |
| 2009/0042471 A1 | 2/2009 | Cashin et al. | |
| 2009/0169825 A1 | 7/2009 | Farmer et al. | |
| 2009/0169835 A1 | 7/2009 | Stowell et al. | |
| 2009/0218672 A1 | 9/2009 | Nakamura | |
| 2010/0028593 A1 | 2/2010 | Takata et al. | |
| 2010/0304072 A1 | 2/2010 | Alvelind | |
| 2010/0152654 A1 | 6/2010 | Tilson et al. | |
| 2010/0168704 A1 | 7/2010 | Thomas et al. | |
| 2011/0312238 A1 | 12/2011 | Bader et al. | |
| 2012/0100334 A1 | 4/2012 | Adams et al. | |
| 2012/0118615 A1 | 5/2012 | Lee et al. | |
| 2012/0169552 A1 | 7/2012 | Lee | |
| 2012/0174753 A1 | 7/2012 | Wagner et al. | |
| 2012/0186430 A1 | 7/2012 | St. Claire et al. | |
| 2012/0150169 A1 | 10/2012 | Chiou | |
| 2012/0276380 A1 | 11/2012 | Traser et al. | |
| 2013/0126533 A1 | 5/2013 | Klosky | |
| 2014/0087616 A1 | 3/2014 | Adams et al. | |
| 2014/0119703 A1 | 5/2014 | Hinaga | |
| 2014/0134378 A1 | 5/2014 | Downs et al. | |
| 2014/0308510 A1 | 10/2014 | Downs et al. | |
| 2014/0311329 A1 | 10/2014 | Dyke et al. | |
| 2014/0335750 A1 | 11/2014 | Adams et al. | |
| 2014/0363615 A1 | 12/2014 | Adams et al. | |
| 2015/0010706 A1 | 1/2015 | Downs et al. | |
| 2015/0082976 A1 | 3/2015 | Downs et al. | |
| 2015/0083473 A1 | 3/2015 | Downs et al. | |
| 2015/0266053 A1 | 9/2015 | Downs et al. | |
| 2015/0275051 A1 | 10/2015 | Downs | |
| 2016/0001472 A1 | 1/2016 | Downs et al. | |
| 2016/0023428 A1 | 1/2016 | Adams et al. | |
| 2016/0031164 A1 | 2/2016 | Downs et al. | |
| 2016/0033236 A1 | 2/2016 | Meldner et al. | |
| 2016/0037633 A1 | 2/2016 | Downs et al. | |

FOREIGN PATENT DOCUMENTS

| | | | |
|---|---|---|---|
| DE | 4010086 | 11/1990 | |
| DE | 202011004434 | 6/2011 | |
| EP | 0361796 | 4/1990 | |
| EP | 0515992 | 12/1992 | |
| EP | 0579047 | 1/1994 | |
| EP | 0699877 | 3/1996 | |
| EP | 0967071 | 12/1999 | |
| EP | 1582107 | 10/2005 | |
| EP | 2133464 | 12/2009 | |
| GB | 2051674 | 1/1981 | |
| JP | 57027738 | 2/1928 | |
| JP | 57027738 A * | 2/1982 | |
| JP | 01123727 | 5/1989 | |
| JP | 01123727 A * | 5/1989 | B29C 65/04 |
| JP | H0446202 | 7/1992 | |
| JP | H0446202 B2 * | 7/1992 | |
| JP | 2000234257 | 8/2000 | |
| JP | 2002539036 | 11/2002 | |
| JP | 2004218170 | 8/2004 | |
| JP | 2006322077 | 11/2006 | |
| JP | 2007135213 | 5/2007 | |
| JP | 2007321652 | 12/2007 | |
| JP | 2008274516 | 11/2008 | |
| JP | 2011245745 | 12/2011 | |
| WO | 1988009630 | 12/1988 | |
| WO | 1994011185 | 5/1994 | |
| WO | 1998030397 | 7/1998 | |
| WO | 2000002427 | 1/2000 | |
| WO | 2000051458 | 9/2000 | |
| WO | 2001028196 | 4/2001 | |
| WO | 2002047899 | 6/2002 | |
| WO | 2003005684 | 1/2003 | |
| WO | 2005025841 | 3/2005 | |
| WO | 2007122009 | 11/2007 | |
| WO | 2008116702 | 10/2008 | |
| WO | 2009036139 | 3/2009 | |
| WO | 2009059402 | 5/2009 | |
| WO | 2011076914 | 6/2011 | |
| WO | 2011163643 | 12/2011 | |
| WO | 2012017233 | 2/2012 | |
| WO | 2012018959 | 2/2012 | |
| WO | 2012150169 | 11/2012 | |
| WO | 2014044688 | 3/2014 | |
| WO | 2014047227 | 3/2014 | |
| WO | 2014047663 | 3/2014 | |
| WO | 2014084947 | 6/2014 | |
| WO | 2014074966 | 7/2014 | |
| WO | 2014160483 | 10/2014 | |
| WO | 2014160492 | 10/2014 | |
| WO | 2014160498 | 10/2014 | |
| WO | 2014160506 | 10/2014 | |

OTHER PUBLICATIONS

USPTO; Non-Final Office Action dated Jun. 3, 2016 in U.S. Appl. No. 14/031,040.

USPTO; Non-Final Office Action dated Jan. 6, 2016 in U.S. Appl. No. 14/309,578.

USPTO; Notice of Allowance dated Feb. 8, 2016 in U.S. Appl. No. 14/309,578.

USPTO; Notice of Allowance dated Jan. 21, 2016 in U.S. Appl. No. 14/732,210.

USPTO; Non-Final Office Action dated Feb. 2, 2016 in U.S. Appl. No. 14/774,562.

EPO; Extended Search Report dated Feb. 19, 2016 in Application No. EP 11815290.9.

(56) References Cited

OTHER PUBLICATIONS

EPO; European Search Report dated May 3, 2016 in Application 13839426.7.
EPO; European Search Report dated Jun. 8, 2016 in Application No. 13838954.9.
Epo; European Search Report dated Jun. 28, 2016 in Application No. 13853204.9.
PCT; International Search Report and Written Opinion dated Jul. 4, 2016 in Application No. PCT/IB2016/000568.
USPTO; Non-Final Office Action dated Sep. 10, 2013 in U.S. Appl. No. 13/168,912.
USPTO; Notice of Allowance dated Mar. 21, 2014 in U.S. Appl. No. 13/168,912.
USPTO; Office Action dated Mar. 21, 2012 in U.S. Appl. No. 13/197,741.
USPTO; Notice of Allowance dated Oct. 4, 2012 in U.S. Appl. No. 13/197,741.
USPTO; Office Action dated Jul. 17, 2013 in U.S. Appl. No. 13/727,919.
USPTO; Office Action dated Dec. 20, 2013 in U.S. Appl. No. 13/727,919.
USPTO; Advisory Action dated Jan. 28, 2014 in U.S. Appl. No. 13/727,919.
USPTO; Notice of Allowance dated Apr. 11, 2014 in U.S. Appl. No. 13/727,919.
USPTO; Non-Final Office Action dated Jan. 14, 2015 in U.S. Appl. No. 13/922,128.
USPTO; Notice of Allowance dated Jun. 1, 2015 in U.S. Appl. No. 13/922,128.
USPTO; Non-Final Office Action dated May 8, 2015 in U.S. Appl. No. 14/031,040.
USPTO; Notice of Allowance dated Apr. 24, 2015 in U.S. Appl. No. 14/076,201.
USPTO; Non-Final Office Action dated Jul. 17, 2015 in U.S. Appl. No. 14/208,017.
USPTO; Non-Final Office Action dated Nov. 19, 2014 in U.S. Appl. No. 14/326,261.
USPTO; Notice of Allowance dated Mar. 10, 2015 in U.S. Appl. No. 14/326,261.
USPTO; Non-Final Office Action dated Jul. 30, 2015 in U.S. Appl. No. 14/732,210.
PCT; International Search Report dated Feb. 10, 1994 in Application No. PCT/US1993/011425.
PCT; International Search Report dated Oct. 31, 2011 in Application No. PCT/US2011/041914.
PCT; Written Opinion of the International Search Authority dated Oct. 31, 2011 in Application No. PCT/US2011/041914.
PCT; International Preliminary Report on Patentability dated May 7, 2012 in Application No. PCT/US2011/041914.
PCT; International Search Report dated Dec. 16, 2011 in Application No. PCT/US2011/046497.
PCT; Written Opinion of the International Searching Authority dated Dec. 16, 2011 in Application No. PCT/US2011/046497.
PCT; International Search Report and Written Opinion dated Feb. 21, 2014 in Application No. PCT/US2013/061509.
PCT; International Search Report and Written Opinion dated Feb. 28, 2014 in Application No. PCT/US2013/060487.
PCT; International Search Report and Written Opinion dated May 7, 2014 in Application No. PCT/US2013/069364.
PCT; International Search Report and Written Opinion dated Aug. 14, 2014 in Application No. PCT/US2014/026796.
PCT; International Search Report and Written Opinion dated Aug. 11, 2014 in Application No. PCT/US2014/026828.
PCT; International Search Report and Written Opinion dated Aug. 20, 2014 in Application No. PCT/US2014/026856.
PCT; International Search Report and Written Opinion dated Dec. 11, 2014 in Application No. PCT/US2014/026870.
EPO; Supplementary European Search Report dated Jul. 27, 1995 in Application No. EP 94902379.
EPO; Office Action dated Apr. 4, 1997 in Application No. EP 94902379.
EPO; Office Action dated Jul. 22, 1998 in Application No. EP 94902379.
EPO; Office Action dated Jun. 17, 1999 in Application No. EP 94902379.
EPO; Office Action dated Aug. 17, 2000 in Application No. EP 94902379.
EPO; European Search Report dated Jan. 7, 2015 in Application No. EP 11799030.9.
CPO; Office Action dated Apr. 2, 2014 in Application No. CN 201180037975.6.
CPO; Office Action dated Nov. 15, 2014 in Application No. CN 201180037975.6.
CPO; Office Action dated Jun. 6, 2014 in Application No. CN 201180031205.0.
CPO; Office Action dated Oct. 8, 2014 in Application No. CN 201180031205.0.
Bralla, "Handbook of Manufacturing Processes—How Products, Components and Materials are Made," Industrial Press, pp. 411, (2007).
eFunda, "Polymers Sorted by Thermoplastic/ Thermoset," pp. 1-2, (2008).
Elaldi et al., "Machining and Joining Process," Smithers Rapra Technology, 7, pp. 163-181, (2001).
Huntsman, "Modification of Polyolefins with Elastamine Polyetheramines," pp. 1-3, (2009).
Schaefer, "Nip Rolls," pp. 1, (2009).
Tomsic, "Dictionary of Materials and Testing," SAE International, 2, pp. 205, (2000).
Troughton, "Handbook of Plastics Joining—A Practical Guide: Chapter 17 A160—Adhesive Bonding," William Andrew Publishing, 2, pp. 145-173, (2008).
USPTO; Non-Final Office Action dated Nov. 18, 2016 in U.S. Appl. No. 14/207,790.
USPTO; Non-Final Office Action dated Sep. 9, 2016 in U.S. Appl. No. 14/208,107.
USPTO; Final Office Action dated Apr. 28, 2017 in U.S. Appl. No. 14/208,107.
USPTO; Non-Final Office Action dated Oct. 4, 2016 in U.S. Appl. No. 14/430,340.
USPTO; Final Office Action dated Dec. 1, 2016 in U.S. Appl. No. 14/774,562.
USPTO; Non-Final Office Action dated May 1, 2017 in U.S Appl. No. 14/774,594.
USPTO; Non-Final Office Action dated Apr. 4, 2017 in U.S. Appl. No. 14/791,025.
USPTO; Non-Final Office Action dated Mar. 10, 2017 in U.S. Appl. No. 14/207,891.
PCT; International Search Report and Written Opinion dated Aug. 26, 2016 in Application No. PCT/IB2016/000919.
Chawla, "Composite Materials" Science and Engineering, Third Edition, Springer, 7-68 (2012).
Sanborn et al., "Tensile Prperties of Dyneema SK76 Single Fibers at Multiple Loading Rates Using a Dirct Gripping Method", J. Dynamic Behavior Mater. 2: 4-14 (2015).

* cited by examiner

SYSTEMS AND METHOD FOR PRODUCING THREE-DIMENSIONAL ARTICLES FROM FLEXIBLE COMPOSITE MATERIALS

CROSS-REFERENCE TO RELATED APPLICATIONS

This application is a Continuation of and claims priority to U.S. patent application Ser. No. 14/076,201 filed Nov. 9, 2013, which claims priority to U.S. Provisional Patent Application Ser. No. 61/724,375 filed Nov. 9, 2012; U.S. Provisional Patent Application Ser. No. 61/780,312 filed Mar. 13, 2013; and U.S. Provisional Patent Application Ser. No. 61/800,452 filed Mar. 15, 2013, all of which are incorporated herein by reference in their entirety.

FIELD OF THE INVENTION

The present disclosure relates to a system and method for producing three-dimensional articles from flexible composite materials. For example, the present disclosure relates to systems and methods for manufacturing three-dimensional shaped articles for airbags/inflatable structures, bags, shoes, and similar three-dimensional articles, based on flexible composite materials.

BACKGROUND OF THE INVENTION

In regards to fabric-related products, there has been continued difficulty in optimizing various combinations of properties such as weight, rigidity, penetrability, waterproof-ability, breathability, color, mold-ability, cost, customizability, flexibility, package-ability, and the like, especially with regard to fabric-related products such as clothing and shoes, camping and hiking goods, comfortable armor, protective inflatables, and the like.

For example, current market trends see the expansion of automotive airbag technology into many new applications including aircraft, bus, and train/high speed rail systems, and for personal head and neck support in sporting, motorcycle, motorsports, or military applications. This same technology has applications in emergency and other commercial floatation systems, emergency floatation vests and gear, avalanche protection, oil & chemical spill control, water bladder reservoirs for outdoor applications, backpacks, bivies and storage systems in general. Trends in airbag technology put a premium on development of very lightweight, thin, high strength, pressure tight envelopes that are impact and puncture resistant.

For many sports activities, the same importance is attached to the weight and strength of the participant's wearable equipment. This is especially true in sports and athletics shoes where a key objective is to provide footwear that is as light as possible but which, at the same time, maintains essential biomechanical structural support properties.

For at least these reasons, development of new cost-effective fabric-related articles, having reduced weight and required structural performance, and new systems and methods of manufacturing fabric-related articles, would be a great benefit.

SUMMARY OF THE INVENTION

In various aspects of the present disclosure, systems and methods for producing three-dimensional articles from various flexible composite materials are disclosed.

In various aspects of the present disclosure, improved monofilament-related products, methods and equipment are provided, along with systems for producing three-dimensional articles from flexible-composite materials.

In various aspects of the present disclosure, systems for the design and manufacture of fabric-related products are described, using the technologies and useful arts herein taught and embodied.

In various aspects of the present disclosure, improvements in efficiently controlling properties of fabric-related products, including but not limited to: weight, rigidity, penetrability, waterproof-ability, breathability, color, mold-ability, cost, customizability, flexibility, package-ability, etc., including desired combinations of such properties, are disclosed.

In various aspects of the present disclosure, methods for manufacturing three-dimensional shaped articles based on flexible composite materials, usable for airbags, inflatable structures in general, bags, shoes, and similar three-dimensional articles, are disclosed.

In various aspects of the present disclosure, a system of manufacturing provides fine-tuning, at desired places on a fabric-related product, directional control of rigidity, flexibility, and elasticity properties.

In various aspects of the present disclosure, fabric-related products combine extreme light weight with extreme strength.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure, wherein.

DETAILED DESCRIPTION OF THE INVENTION

Figure 1:
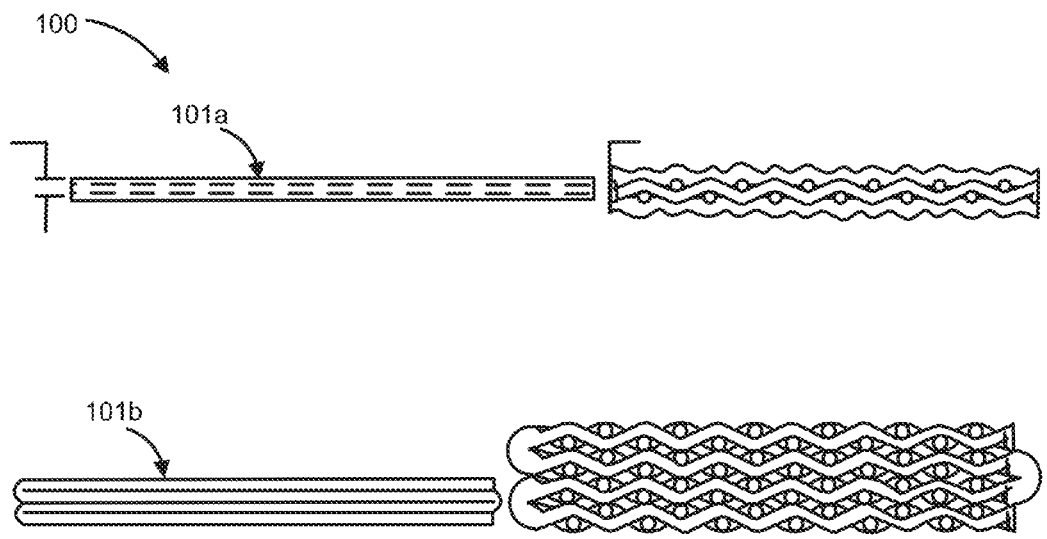
FIG. 1 shows side views of thin engineered flexible composite materials adjacent conventional woven materials in accordance with various embodiments of the present disclosure.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

As described in more detail herein, various embodiments of the present disclosure generally comprise a laminate including reinforcing elements therein, such reinforcing elements including at least one unidirectional tape having monofilaments therein, all of such monofilaments lying in a predetermined direction within the tape, wherein such monofilaments have diameters less than 40 microns and wherein spacing between individual monofilaments within an adjoining strengthening group of monofilaments are abutting adjacent monofilaments or are within a gap distance in the range between non-abutting monofilaments up to fifty times the monofilament major diameter. In various embodiments, the gap distance in the range between non-abutting monofilaments may be up to nine times the monofilament major diameter.

In various embodiments of laminates in accordance with the present disclosure, the tows consisting of a bundle of large numbers of monofilaments are extruded, pull-truded or otherwise converted from a plurality of tows of monofilaments, into a thin planar unitape consisting of a plurality of substantially parallel oriented monofilaments of predetermined thickness, fiber areal density, resin matrix coating or embedment specification to meet the design specifications from computer structural analysis or preexisting specification. Additionally, reinforcing elements may comprise at least two such unidirectional tapes, each having extruded monofilaments therein, all of such monofilaments lying in a predetermined direction within the tape, wherein such monofilaments have diameters less than 40 microns and wherein spacing between individual monofilaments within an adjoining strengthening group of monofilaments are abutting adjacent monofilaments or are within a gap distance in the range between non-abutting monofilaments up to fifty times the monofilament major diameter. In various embodiments, the gap distance in the range between non-abutting monofilaments may be up to nine times the monofilament major diameter. In various embodiments, unidirectional tapes comprise larger areas without any monofilaments, and wherein such larger areas comprise laminar overlays comprising smaller areas without monofilaments.

Specifications for particular unitapes used may have differing fiber areal densities, resin specifications, spread specifications, layer thickness fiber types, and may contain differing blends of two or more fibers.

In various embodiments of a laminate in accordance with the present disclosure, smaller areas comprise user-planned arrangements. In various embodiments, laminates further comprise a set of water-breathable or waterproof/breathable (W/B) elements comprising laminar overlays of such smaller areas. Further, laminates may comprise a set of other laminar overlays. Moreover, a laminate in accordance with the present disclosure may comprise a first one of such at least two unidirectional tapes that includes monofilaments lying in a different predetermined direction than a second one of such at least two unidirectional tapes.

In various embodiments of the present disclosure, a combination of the different predetermined directions of such at least two unidirectional tapes is user-selected to achieve laminate properties having planned directional rigidity/flexibility. Also in various embodiments, a laminate may comprise a three-dimensionally shaped, flexible composite part. In various embodiments, a three-dimensionally shaped, flexible composite part comprises multiple laminate segments attached along peripheral joints. In various embodiments, three-dimensionally shaped, flexible composite parts comprise at least one laminate segment attached along peripheral joints to at least one non-laminate segment. In various embodiments, such products can comprise multiple laminate segments attached along area joints.

In various embodiments of the present disclosure, a fabric-related product comprises at least one laminate segment attached along area joints to at least one non-laminate segment. Such products may comprise at least one laminate segment attached along area joints to at least one unitape segment. Additionally, such products may comprise at least one laminate segment attached along area joints to at least one monofilament segment. In various embodiments, such products may further comprise at least one rigid element. In various embodiments of the present disclosure, at least one unidirectional tape is attached to such a product.

In various embodiments of the present disclosure, a method of producing three-dimensionally shaped, flexible composite parts comprises the steps of: providing at least one male mold and at least one female mold having compatible configurations; applying at least one first fiber-reinforced scrim over such at least one male mold, said first fiber-reinforced scrim comprising two or more layers of unidirectional fibers placed at different orientations; optionally applying at least one second fiber-reinforced scrim over such at least one male mold and such at least one first fiber-reinforced scrim, said second fiber-reinforced scrim comprising two or more layers of unidirectional fibers placed at different orientations; optionally applying at least one first surface layer over such at least one male mold, such at least one first fiber-reinforced scrim, and such second fiber-reinforced scrim to form a first composite layup; removing such first composite layup from such at least one male mold and placing such first composite layup, in an inverted configuration, within such at least one female mold; optionally using a release liner by applying at least one release liner to such at least one male mold; removing such at least one release liner from such at least one male mold and placing such release liner, in an inverted configuration, within such at least one female mold over such first composite layup; optionally applying at least one second surface layer over such at least one male mold; applying at least one third fiber-reinforced scrim over such at least one male mold and such at least one second surface layer, said third fiber-reinforced scrim comprising two or more layers of unidirectional fibers placed at different orientations; optionally applying at least one fourth fiber-reinforced scrim over such at least one male mold, such at least one third fiber-reinforced scrim and such at least one second surface layer to form a second composite layup, said fourth fiber-reinforced scrim comprising two or more layers of unidirectional fibers placed at different orientations; removing such second composite layup from such at least one male mold and placing such second composite layup, in an inverted configuration, within such at least one female mold over the first composite layup; joining along peripheral edges of such first composite layup and such second composite layup; and curing such first composite layup and such second composite layup to form at least one three-dimensional shaped article.

In various embodiments of the present disclosure, a method further comprises the optional second fiber-reinforced scrim as an additional layer in said first composite layup.

In various embodiments of the present disclosure, a method further comprises the optional first surface layer as an additional layer in said first composite layup.

In various embodiments of the present disclosure, a method further comprises the optional second surface layer as an additional layer in said second composite layup.

In various embodiments of the present disclosure, a method further comprises the optional fourth fiber-reinforced scrim as an additional layer in said second composite layup.

In various embodiments of the present disclosure, a method further comprises the optional at least one release liner disposed between said first composite layup and said second composite layup.

In various embodiments of the present disclosure, a method further comprises the step of forming at least one opening into such at least one three-dimensional shaped article to assist inflation or other manipulation of such at least one three-dimensional shaped article. In various embodiments, a method further comprises the step of removing such at least one release liner through such at least one opening. In various embodiments, a method further comprises the step of adding at least one reinforcing structure to such at least one three-dimensional shaped article.

In various embodiments of the method in accordance with the present disclosure, at least one three-dimensional shaped article is integrated within a shoe. In various embodiments, at least one three-dimensional shaped article is integrated within a bag. In various embodiments, at least one three-dimensional shaped article is gas impermeable. In various embodiments, at least one three-dimensional shaped article is configured to be gas inflatable. In various embodiments, at least one three-dimensional article is waterproof/breathable (W/B).

In various embodiments of the present disclosure, a method of producing three-dimensionally shaped, flexible composite parts comprises the steps of: joining two symmetrical flexible composite parts by folding peripheral material from a first part side over a second part side to form a region of overlap seam; and curing such two symmetrical flexible composite parts to form a unitary three-dimensionally shaped flexible composite part having a hollow interior.

In accordance with various embodiments hereof, the present system provides each and every novel feature, element, combination, step and/or method disclosed or suggested by this patent application.

Brief Glossary of Terms and Definitions Used Herein

Adhesive: A curable resin used to combine composite materials.

Anisotropic: Having mechanical and or physical properties which vary with direction at a point in a material (i.e., not isotropic).

Areal weight: The weight of fiber per unit area, often expressed as grams per square meter (g/m$^2$).

Autoclave: A closed vessel for producing an environment of fluid pressure, with or without heat, to an enclosed object which is undergoing a chemical reaction or other operation.

B-stage: Generally defined herein as an intermediate stage in the reaction of some thermosetting resins. Crosslinking polymer adhesive or resins used in pre impregnated are sometimes pre reacted to this stage, called "prepregs", to facilitate handling and processing prior to final cure.

C-stage: Final stage in the reaction of certain resins in which the material is relatively insoluble and infusible.

Cure: To change the properties of a polymer resin irreversibly by chemical reaction. Cure may be accomplished by addition of curing (cross-linking) agents, with or without catalyst, and with or without heat. The term cure may refer to a partial process or a full process.

Decitex (DTEX): Unit of the linear density of a continuous filament or yarn, equal to $\frac{1}{10}^{th}$ of a tex or $\frac{9}{10}$th of a denier.

Dyneema®: A brand of ultra-high-molecular-weight polyethylene (UHMWPE) fiber supplied by DSM (Heerlen, The Netherlands).

Fiber: A general term synonymous with filament.

Filament: The smallest unit of a fiber-containing material. Filaments usually are of long length and small diameter.

Last: A three-dimensional forming tool for shoes.

Polymer: An organic material composed of molecules of monomers linked together.

Prepreg: A ready-to-cure sheet or tape material, wherein resin is partially cured to a B-stage and supplied to a layup step prior to full cure.

Tow: An untwisted, twisted, or entangled bundle of continuous filaments.

Upper: The portion of a shoe that covers the upper portion of the foot, from heel to toe.

UHMWPE: Ultra-high-molecular-weight polyethylene. A type of polyolefin made up of extremely long chains of polyethylene. Trade names include Spectra® and Dyneema®.

Unitape: Uni-directional tape (or UD tape), which are flexible reinforced tapes (also referred to as sheets) having uniformly or non uniformly dense arrangements of reinforcing fibers in generally parallel alignment and impregnated with an adhesive resin matrix. This resin may be reactive crosslinking polymer often containing a catalyst or curing agent and undergoes a non reversible reaction during processing or a thermoplastic resin that melts and can be reformed by successive heating and cooling. UD tapes are often B-staged, and form the basic unit of many composite fabrics.

Viscoelastic material: Materials that exhibit both viscous and elastic characteristics when undergoing deformation. Such materials may exhibit linear or nonlinear rheological response under mechanical loading.

With reference now to FIG. 1, various embodiments of a three-dimensional composite article system 100 comprises seamless three-dimensional shaped articles 101a and 101b usable for airbags/inflatable structures, bags, shoes, and other three-dimensional articles, based on flexible composite materials. As used herein, seamless refers to items integrally bonded so as to be structurally seamless. Various embodiments of manufacturing processes of the present system are capable of producing three-dimensionally shaped, flexible parts with integrated structures and directional fiber reinforcement. Various articles of three-dimensional composite article system 100 include, but are not limited to, shoes, backpacks/bags, or inflatable parts such as airbags or balls, and the like. In traditional three-dimensionally shaped textiles, flat goods cut into complex shapes are stitched or seamed together to produce the three-dimensional shape. In various embodiments of manufacturing processes in accordance with the present disclosure, composite molding methods are combined with novel precursor materials to form fiber-reinforced continuous shaped articles that are flexible and collapsible.

FIG. 1 further illustrates a side-view comparison of two embodiments of thin engineered substantially flexible composite materials 101a and 101b, in accordance with the present disclosure, to a much thicker, conventional woven material. In general, the methods described in the present disclosure provide materials substantially thinner than conventional materials.

Figure 2:
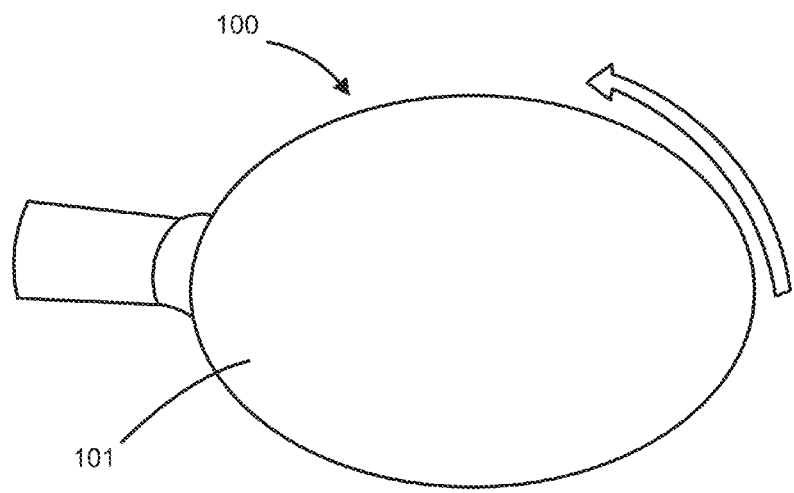
FIG. 2 shows a perspective view of a three-dimensional flexible composite article, in accordance with various embodiments of the present disclosure.

FIG. 2 illustrates, in perspective view, an embodiment of a seamless three-dimensional shaped article 101 in accordance to the present disclosure. In various embodiments, material that is thinner than existing fabrics are possible due to the use of high strength fiber and minimum surface coating. For example, in airbag applications, the thin composite materials allow for reduced packing volumes, as shown in FIG. 1.

Current market trends see the expansion of automotive airbag technology into many new applications including aircraft, bus, train/high speed rail systems, and for personal head and neck support for sporting, motorcycle, motorsports, or military applications. This same technology has applications in emergency and other commercial floatation systems, emergency floatation vests and gear, avalanche protection, oil and chemical spill control, bladder dams, water bladder reservoirs for outdoor applications, backpacks, bivies (i.e., bivouac, meaning a small tent or shelter), and storage systems in general.

Trends in airbag technology put a premium on development of very lightweight, thin, high strength, multidirectional reinforced, pressure tight envelopes that are impact and puncture resistant. Controlled compliance and deformation can be used to absorb shock and manage impact impulse. Automotive applications for side curtain, in-seat and lap belt protection need to be very lightweight, packable into the smallest possible volume, and have the ability to be formed into the most advantageous 3D shape for optimal deployment and protection. The often complex 3D shapes must be strong, exhibit high burst pressure, impact and puncture resistance, and must inflate to their predetermined shape without bursting or failing at any seam/attachment.

They generally need to have a high degree of pressure integrity and impermeability because of limited volumes of stored pressure inflation media. This is especially critical because many systems have operational requirements that the bags stay inflated 7-10 minutes after impact and/or deployment, and for some applications, it may be desirable for the bag to stay inflated much longer. An example of this is helicopter airbag crash systems where the initial deployment cushions the impact of the helicopter, but in water it is desirable to have the bags remain inflated to provide floatation to prevent sinking of the helicopter.

Another similar application where post-inflation pressure and reusability is beneficial is in aircraft airbags for overwater use. Airbags are desirable for crash protection in commercial airliners but weight and storage volume are at a premium for these applications. Airliners are already required to carry floatation devices onboard for emergency-over-water use, so if the function of crash protection for landing impact can be combined with secondary floatation applications, the utility of such systems is enhanced. This technology is equally applicable to the emergency egress slides of commercial aircraft and also to the over water non-crash airbag emergency egress and floatation systems.

In addition to the packing, deployment, and inflation requirements, airbag construction utilizing the technology disclosed herein can also improve and enhance the ability for the airbag to provide life and injury protection during the crash/impact deployment and post-crash protection functions. The high strength and mechanical properties of the three-dimensional shaped articles 101 of the present disclosure have well-controlled deployment into predictable shapes. The structure of the bag can be enhanced for impact absorption and energy dissipation and the impact surface of the bags can be optimized for surface properties such as softness or coefficient of friction to prevent excessive loads, accelerations and rotations on the bodies of the occupants.

The damage tolerance, puncture resistance, and extremely high resistance to rip or puncture damage propagation preferably allow bags to continue to function after local damage without complete failure or bursting.

In various embodiments, a high degree of pressure integrity of three-dimensional shaped articles 101 in accordance with the present disclosure enables not just prolonged or even permanent inflation, but also the incorporation of practical multistage inflation gas systems in the airbag system for improved occupant protection, while still meeting storage, packing, gas storage, and volume constraints. Another benefit of the durability of the materials and construction is that airbags in accordance to the present disclosure may be recycled and used multiple times.

In various embodiments of the present system, one scrim layer is stretched over a male mold and cured in the shape of the mold (see also FIG. 15, discussed herein below). A scrim is made of two or more adhesive coated fiber reinforced layers, for example, unitapes. More than one scrim layer may be added, as desired, to improve dimension stability and tear strength of the final material. The number of layers, adhesive or fiber type, surface layer type or configuration, and initial state of the scrim (uncured or cured), are all variables that may be substituted without changing the basic inventive concept. At least one preferred application of this embodiment is shoes, where the scrims may be stretched around a "last." Various footwear embodiments in accordance with the present disclosure are described in a later section herein below. In various embodiments of the present system, additional unitape layers may be added to limit stretch along specific load paths. In other embodiments of the present system, surface layers may be added to the stack cured around the mold.

In various embodiments, a unitape layer comprises thinly spread substantially parallel fibers coated by, or embedded in, a matrix adhesive. The monofilament fibers that make up these unitape layers are spread such that the monofilaments that make up the fiber are positioned approximately side-by-side, individually coated with adhesive or embedded in an adhesive or resin. Positioning may such that the spacing distance between monofilaments or areal weight distribution of monofilaments may be uniform, non uniform, or such that the monofilament layer incorporates spacing between heavier weight unitapes comprising a thickness of several filaments. Positioning may be such that the spacing distance between monofilaments may be uniform, non uniform, or such that the monofilaments abut or overlap. In some cases, the monofilament tows may incorporate a twist or entanglement of the constituent monofilaments to limit or control spreading. However, the concept of spreading and coating filaments within a fiber containing many filaments is similar. In various embodiments, the adhesive comprises an elastic polymer. This option gives the unitape compliance, and allows it to be stretched and molded in its non-fiber-reinforced directions. A unitape layer may be positioned individually onto the mold for local reinforcement.

Figure 3:
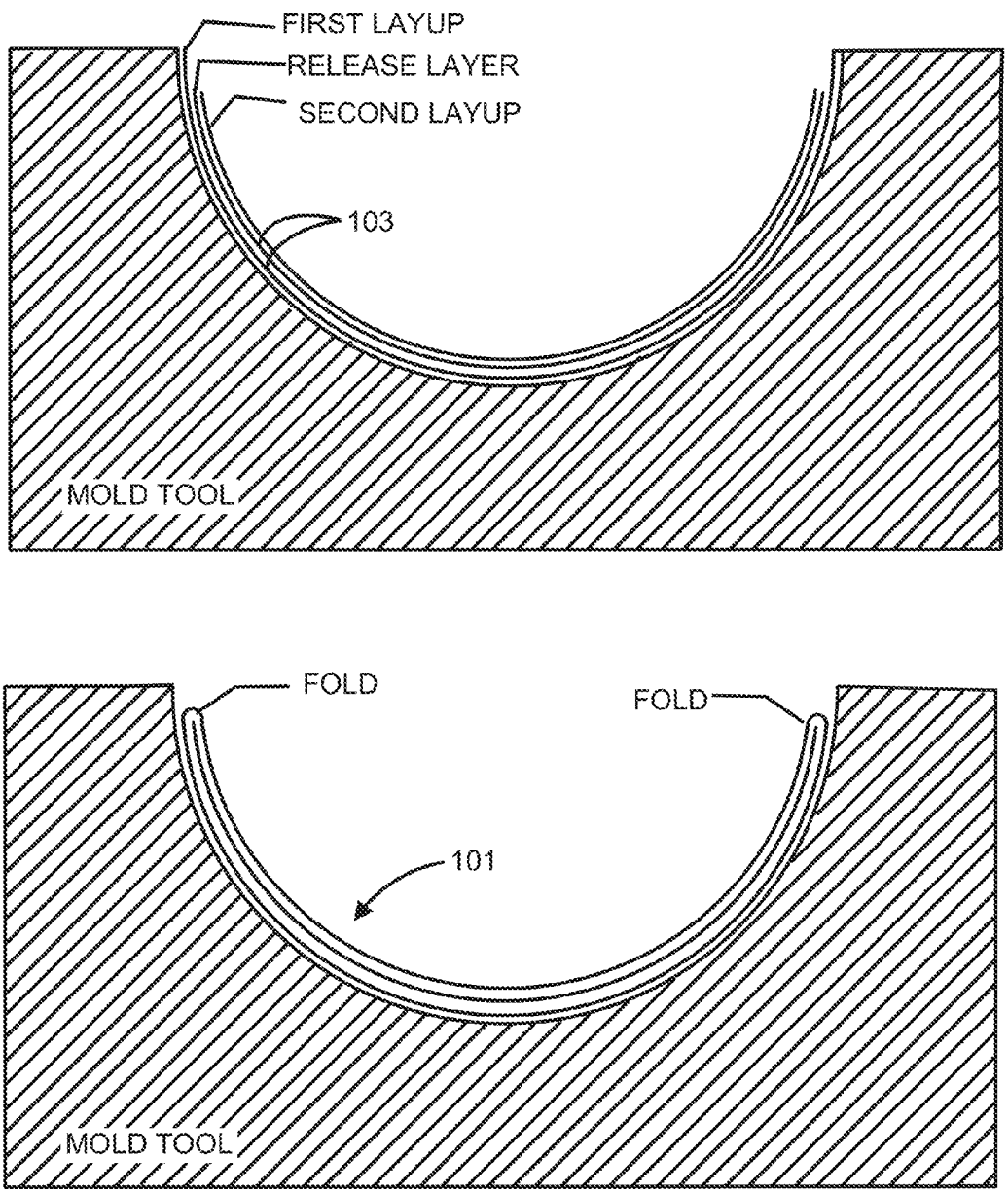
FIG. 3 shows a sectional view of tools and molding arrangements used to produce three-dimensional articles in accordance with various embodiments of the present disclosure.

FIG. 3 shows a sectional view of an embodiment of various tools and molding arrangements usable to produce three-dimensional shaped articles 101 in accordance with the present disclosure. A method for molding the unitape over a complex part while maintaining fiber uniformity comprises a step of first creating a scrim wherein two layers of flat unitape are stuck together at different orientations such as 0° and 90°, or in any other relative orientation as required by the particular design. The resulting scrim stretches in its bias directions but the filaments are stabilized by the reinforcement of the intersecting layer. This allows the filaments to be positioned and stretched onto the mold in a manner that maintains filament alignment and minimizes wrinkled fibers.

An embodiment of a method used to create a three-dimensional shaped objects in accordance with the present disclosure comprises providing a male mold and a female mold having essentially compatible dimensions. A first 0°/90° scrim may be made from at least one layer of unitape. The scrim constructed in this manner stretches significantly in the bias directions, and thus can be stretched over the male mold. An second 0°/90° unitape scrim may be oriented 45° from the first layer and stretched over the male mold and the first scrim. Optionally, a film or surface layer is stretched over the first and second scrims. This first stack-up can then be removed from the male mold, inverted, and placed in the complementary female mold. Optionally, a release liner, for example Teflon, is stretched over the male mold. The release liner is then removed from the male mold, inverted and placed in the female mold over the first stack-up. Next, an optional film or surface layer can stretched over the male mold, this time the first layer in the stack. Next, a third 0°/90° unitape scrim can be stretched over the male mold. Optionally, a fourth 0°/90° unitape scrim can be oriented 45° from the first layer and stretched over the male mold and the third scrim. This second stack-up is then removed from the male mold, inverted, and placed in the female mold over the first stack-up or the optional release liner. The first stack-up preferably comprises some excess overhanging material that can be folded over the second stack-up to form a joining of edges of the first and second stack-ups. In various embodiments, these layers are vacuum-bagged to the female mold and cured in an autoclave. When the part is cured, the optional release liner prevents the first and second stack-ups from bonding together in places other than the folded over edges. In accordance to such methods, a continuous formed three-dimensional shaped article 101 is created that does not require any additional joining. In various embodiments, the resulting three-dimensional shaped article 101 can be inflated to its final 3D shape by cutting a hole into the layers and filling the part with air. In various embodiments, the release liner, when utilized, can be removed through this hole.

The above-described manufacturing method is useful for 3D parts that are symmetrical, such as, a sphere, egg, cylinder, or cube (also see FIG. 2 for an example).

The above-described embodiment implements the joining of two symmetrical parts by folding extended material from one layup onto and over another layup to form a seam that can be cured so as to be structurally seamless within the formed composite part. After the part is cured it may be inflated, the second side will invert, and the vestiges of this seam will be located at the centerline of the part. This exemplary method is useful for thin, flexible materials where the crease at the seam becomes negligible once the part is inflated.

The method disclosed herein is an improvement over existing manufacturing processes because the resulting part requires only a limited number of secondary processes for completion. For applications where there is limited packing volume, or in instances where weight savings is critical, a part having minimal seams, which reduces the thickness and/or weight of the part, is beneficial.

Figure 4:
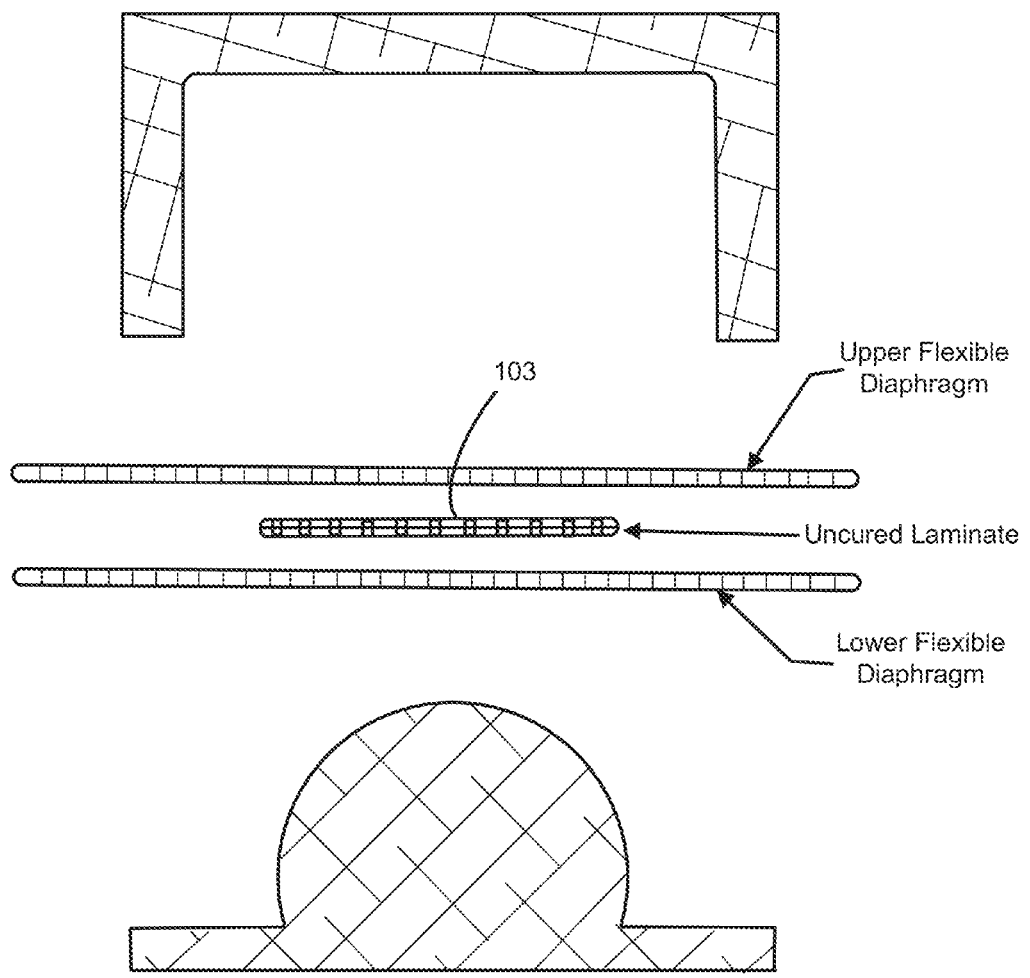
FIG. 4 shows a sectional view of alternate preferred tools and molding arrangements used to produce preferred articles in accordance with various embodiments of the present disclosure.

FIG. 4 illustrates a sectional view of alternate embodiments of tools and molding arrangements usable to produce various three-dimensional shaped articles in accordance with the present disclosure. As illustrated in the embodiment of FIG. 4, an uncured or formable laminate 103, such as comprising scrim layers, may be sandwiched between layers of flexible diaphragm. The uncured and un-formed composite can then be disposed between male and female tools of the mold for shaping and curing.

Figure 5:
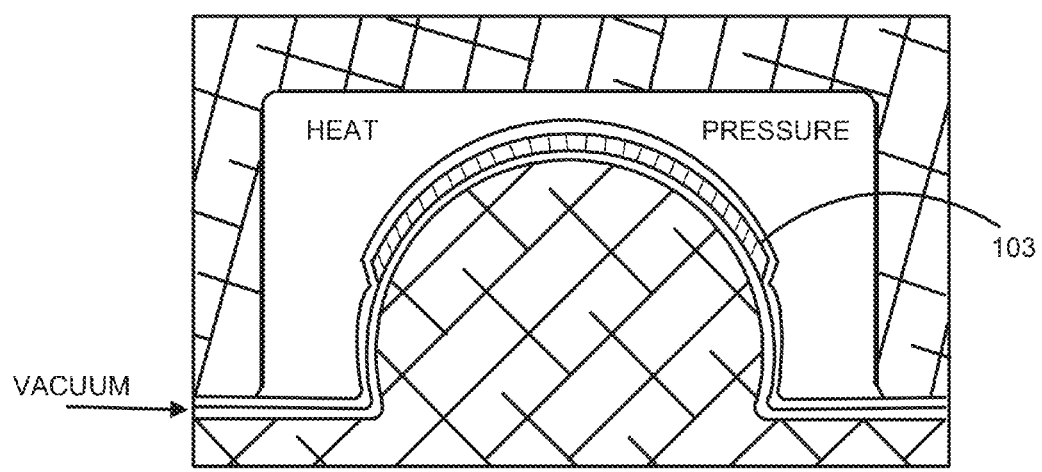
FIG. 5 shows a sectional view of preferred tools and molding arrangements of FIG. 4 in accordance with various embodiments of the present disclosure.

FIG. 5 illustrates a sectional view of an embodiment of molding tools and molding arrangements, and the resulting shaping and curing of the laminated material into a composite part. As illustrated, heat and/or pressure and/or vacuum may be used in any combination to shape and cure the laminated structure into a shaped composite part. Various methods for shaping and curing include, but are not limited to, autoclave compression, hydro or diaphragm forming, amongst other methods known to one skilled in the art.

Figure 6:
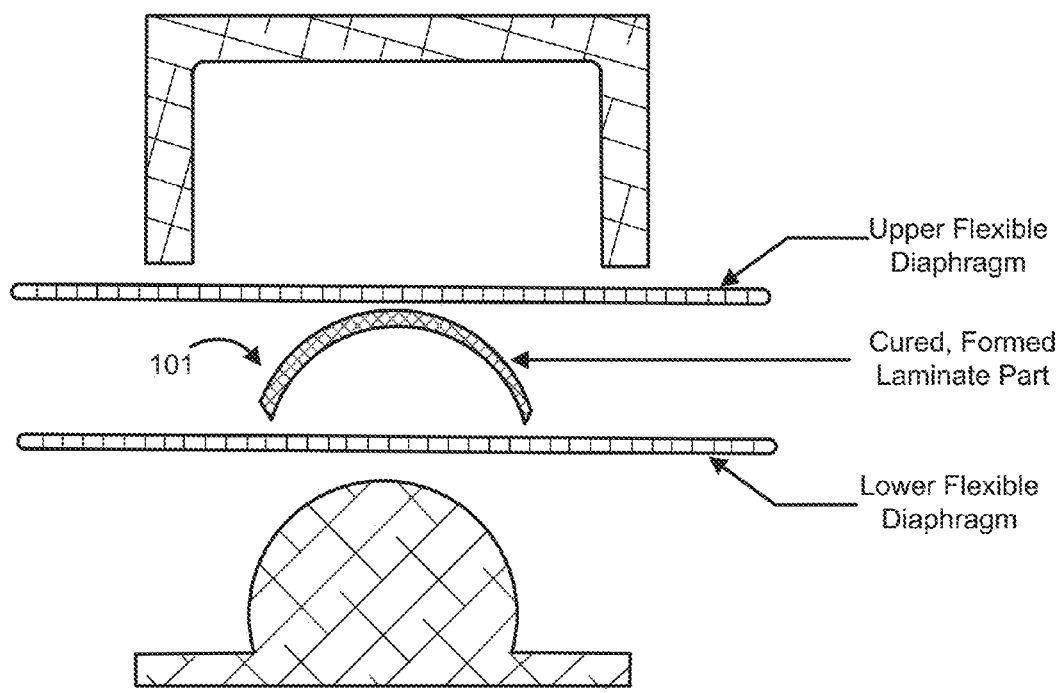
FIG. 6 shows a sectional view of an article produced by the preferred tools and molding arrangements of FIG. 4 in accordance with various embodiments of the present disclosure.

FIG. 6 illustrates a sectional view of another molding and curing operation in accordance with various embodiments of the present disclosure. In the process illustrated in FIG. 6, a previously cured and formed laminate part, (e.g. the part resulting from the operations depicted in FIGS. 4-5), is sandwiched between flexible diaphragm layers and positioned between male and female tools of the mold. The layered structure, with or without any number of surface layers, is laid onto a mold and formed and/or cured using various methods including, but not limited to, autoclave compression, hydro or diaphragm forming, or other methods that would be known to one skilled in the art.

Figure 7A:
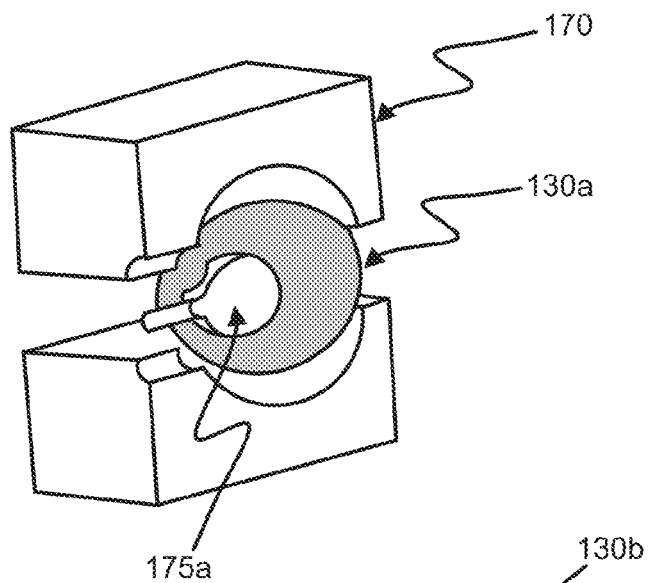
FIGS. 7a, 7b and 7c show a schematic diagram, generally illustrating alternate preferred steps, tools, and molding arrangements for the production of preferred flexible composite articles, in accordance with various embodiments of the present disclosure.
Figure 7B:
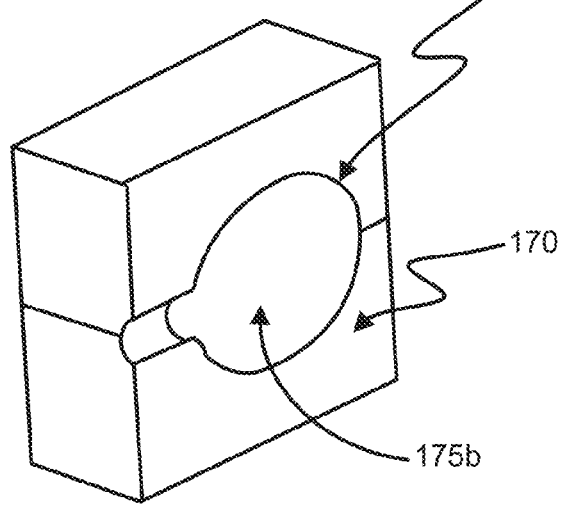
Figure 7C:
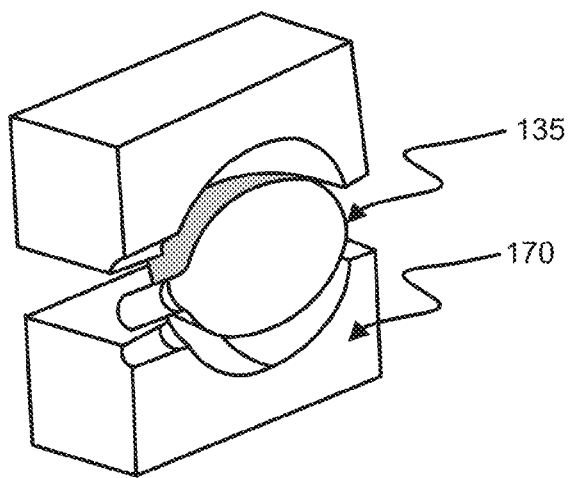

FIGS. 7a, 7b and 7c show an exploded schematic of an embodiment of a female mold process in accordance with the present disclosure. In the process depicted in FIGS. 7a-c, a part is laid up on a mold and an inflatable bladder is inserted into the part to apply pressure to the inside of the part to force the material into the shape of the mold while it is cured.

As illustrated in FIG. 7a, a composite part 130a is placed within a female mold 170, and an inflatable bladder 175a is inserted into the composite part 130a to apply pressure to the inside of the part while the part is cured by any one or combination of, heat, UV, RF and E-beam curing. The elastomeric bladder 175a applies uniform pressure (e.g. air or liquid pressure) to the composite part 130a, forcing the part into the shape of the mold.

FIG. 7b illustrates the expanded composite part 130b form-fitting the internal shape of the female mold 170. If desired, the elastomeric bladder 175b (now expanded to the shape of the mold) may be co-cured to the internal surface of the composite part 130b to form, for example, an inner pressure bladder or inner skin or layer of the article. If this inner bladder material layer is not needed, the bladder may be deflated and removed from the mold, leaving the part 130b expanded and cured in place without a co-cured bladder layer.

FIG. 7c illustrates an embodiment of a shaped composite part 135 released from the now-opened mold 170.

Another exemplary embodiment, useful for footwear applications, for example, comprises the option of using an inflatable bladder as a 3D forming tool, whereby composite unitapes and/or B-staged, C-staged, or thermoplastic matrix, pre-plied, angle-ply or laminate-cut patterns may be layered and assembled thereon. For such embodiments, the inflatable bladder preferably has structural rigidity sufficient to accommodate layering of materials on it.

For purposes of assembly and layup of the shoe upper on an inflatable bladder, at least three ways to solve the bladder rigidity issue can be realized. A first way is to use a removable multicomponent three dimensional form tool that supports the elastomeric bladder, removable at some point in the manufacturing process to allow the flexible composite part to be removed from the mold and the bladder. A second way is to use an elastomeric bladder that may be reinforced with a fabric composite such that it can be pressurized to the point where it is rigid enough to act as a form for application of the constitutive components comprising the upper. A third way is to use Shape Memory Polymer (SMP) in conjunction with elastomeric pressure application tools. Such polymers are rigid at low temperature but convert to high elongation, flexible elastomers at temperatures above their transition temperature. Above their transition temperatures, SMP's can be placed in a heated mold and pressurized to form the tool in its elastomeric phase, duplicating the shape of the mold with accuracy which, in the case of a shoe molding system, would be the desired shape for the inside of the shoe.

Figure 24:
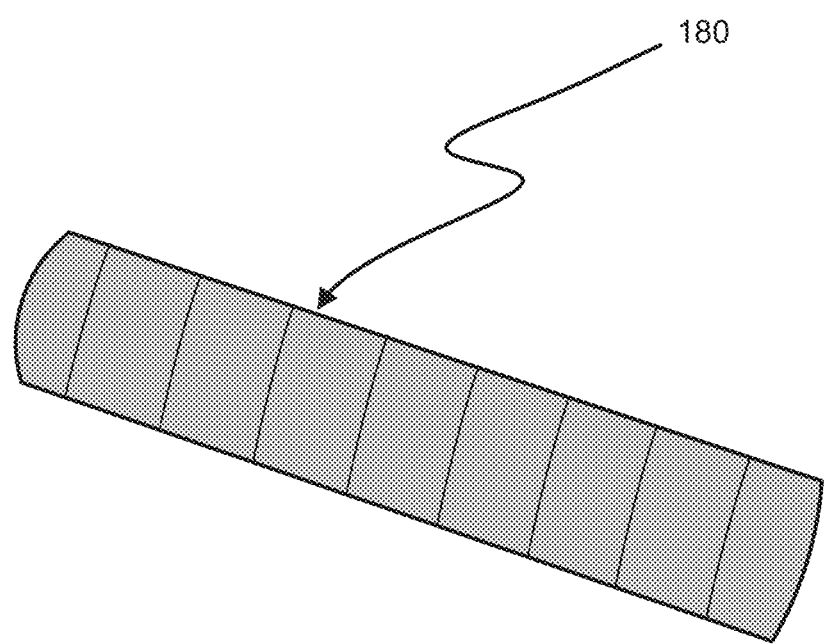
FIG. 24 shows an embodiment of a tube formed from rigidized Shape Memory Polymer (SMP), in accordance with various embodiments of the present disclosure.
Figure 25:
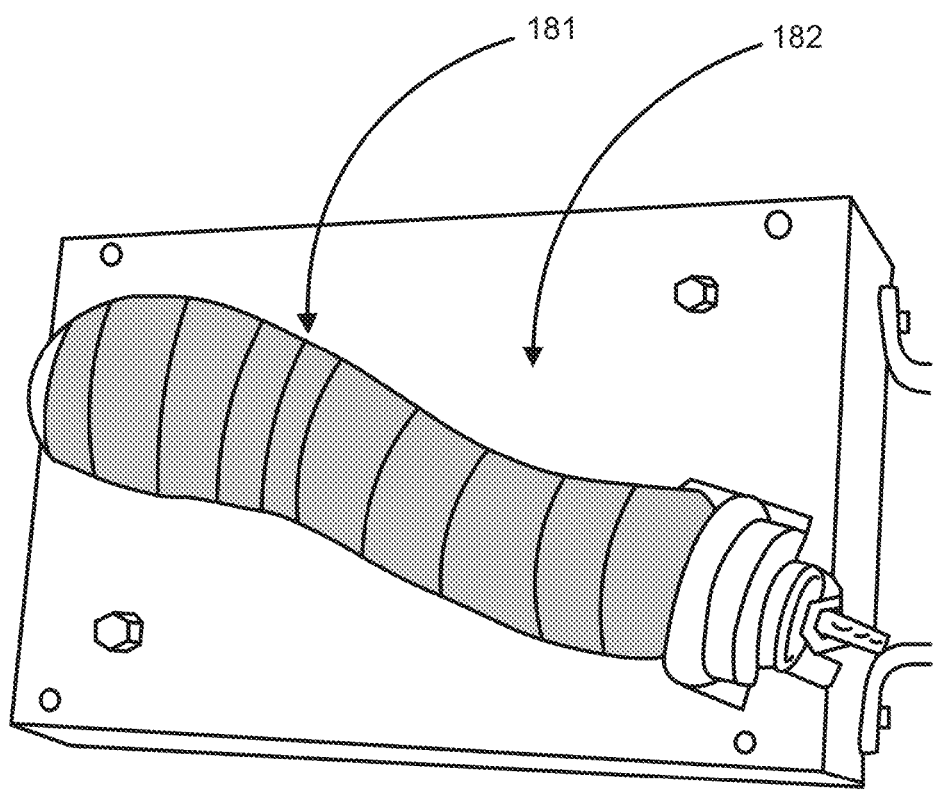
FIG. 25 shows a tube of SMP further shaped within a female mold, in accordance with various embodiments of the present disclosure.
Figure 26:
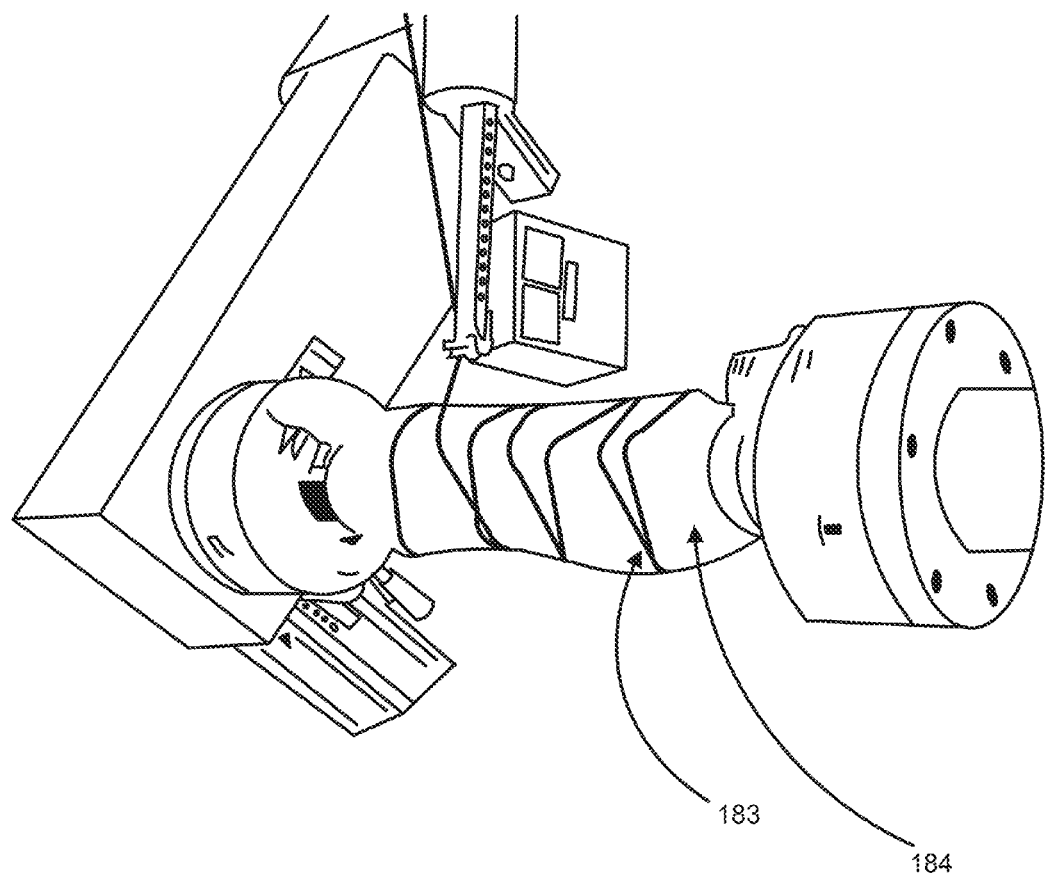
FIG. 26 shows application of fiber tows to a rigidized form tool, in accordance with various embodiments of the present disclosure.

As the mold is cooled below the transition temperature of the SMP, the SMP converts to a rigid solid in the shape of the inner form dimensions of the shoe upper. In this "rigidized" form, the tool can be used as a lay-up form tool for the shoe molding process. An example of a formed structure of rigidized SMP is the tube 180 shown in FIG. 24. For this embodiment, the SMP was rigidized in tubular form on a mandrel by cooling the SMP below its transition temperature. FIG. 25 shows an SMP tube 181 after the SMP was heated above its transition temperature, shape-formed within a female mold 182 (only the lower half of the mold is shown), and then cooled below the transition temperature of the SMP, under pressure, to produce the rigid form tool in the shape of the cavity of the mold 182. FIG. 26 shows an embodiment of a process whereby fiber tows 183 are applied to rigidized tool 184.

In various embodiments, such as, for example, in footwear applications, the cured composite upper can be removed from the rigidized tool either by removing the cured assembly from the mold at slightly above the transition temperature, while the SMP is still in its elastomeric shape, or removing after the assembly has been removed from the mold by blowing hot air inside to soften it enough for removal. In various other embodiments, the rigidized tool can be left integrated onto the composite to keep the shape of the composite intact and to provide an easily indexable "cartridge" style system to store, carry and load the engineered "chassis" upper into any downstream manufacturing operation. Such downstream operations may include, for example, integration with cosmetic outer layers, and lamination of the upper to the lower if that step has not already been accomplished in the initial, (and optionally one-step), molding process.

The tool with the composite shoe laid-up over the form may be then placed into a female mold and the SMP pressurized and heated past its transition temperature where it softens and acts as an elastomeric pressure bladder to consolidate and laminate the materials in the shoe upper together.

In alternative embodiments, film or surface layers may be bonded on one or on both sides of the part. These layers may be films (PET, Nylon, ECTFE, urethane, etc.), breathable membranes (Teflon, urethane, etc.), woven or non-woven fabrics, leather, or other layers. The selection of the surface layer is based on end use requirements, such as gas tightness or permeability, waterproofness, abrasion resistance, durability, aesthetics, or others.

In alternate embodiments of the present system, the scrim is pre-cured in a flat form between release liners. This material can be sold to suppliers for subsequent lay-up. In various other embodiments of the present system, multiple layers of scrim are stretched onto a mold and glued into place by coating each layer with adhesive. In various other embodiments of the present system, an existing adhesive already coating the filaments of the scrim is thermoplastic, and may be re-melted to bond the layers. In various other embodiments of the present system, the scrim is pre-cured in a flat form having a film or surface layer applied on one or both sides. This extra layer, or layers, can serve a number of purposes, such as, being thermoplastic, breathable, and/or waterproof. For example, a layer may comprise a waterproof breathable (W/B) membrane. It should be noted that any surface layers incorporated with the scrim in its flat form should not inhibit bias stretch. Otherwise the ability to mold this flat product may be reduced.

In various embodiments of the present system, the scrim may contain multiple unitape layers, oriented in 3, 4, or more directions, depending on the structure requirements of the finished part. For example, a shoe may require a scrim with a layup comprising 90°/45°/−45° orientation of fibers, such that there is sufficient stretch in the 0° direction for the scrim to be molded over the toe and such that the main load paths run down the sides of the shoe. This exemplary multilayered unitape scrim may be constructed or supplied in raw form or in the versions described in the alternative embodiments of this invention, such as pre-cured in a flat form between release liners or pre-cured in a flat or roll-to-roll form having a film or surface layer applied on one or both sides.

Figure 8:
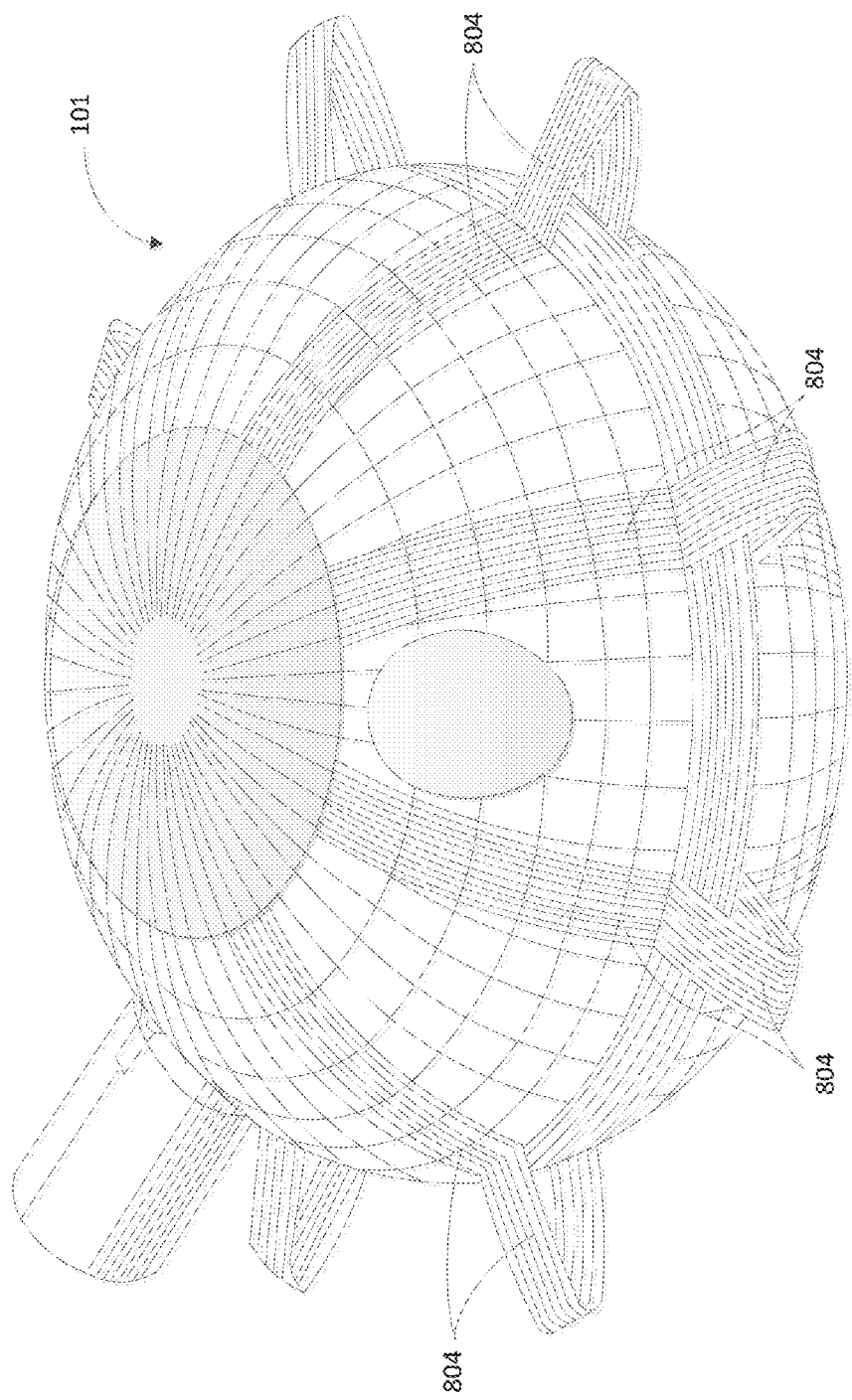
FIG. 8 shows a perspective view, diagrammatically illustrating a flexible composite article containing integrated structural reinforcements for attachment points, through holes, and reinforcing straps for enhanced load carrying capability, in accordance with various embodiments of the present disclosure.

FIG. 8 illustrates, in perspective view, an embodiment of a three-dimensional shaped article 101 comprising integrated structural reinforcements 804 for attachment points, thru-holes, and reinforcing straps for enhanced load carrying capability, in accordance with the present disclosure. Such integrated structural reinforcements 804 can be made from layers of unitape or other composite material that are incorporated between or on the surface of the scrim layers that make up the part and which are co-cured into the finished part. By incorporating such structural reinforcements into the part, post processing bonding steps for attachment points and thru-hole reinforcement are reduced or eliminated.

Figure 9:
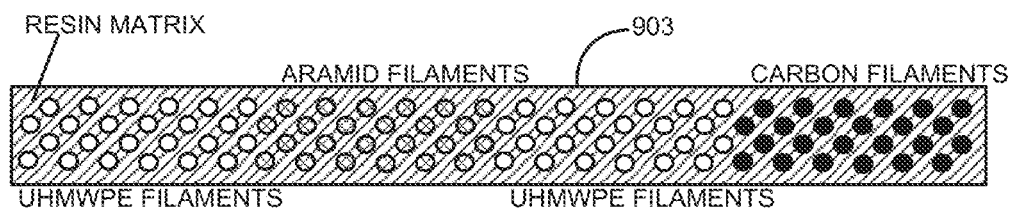
FIG. 9 shows a sectional view, diagrammatically illustrating alternate flexible composite materials made with two or more monofilaments, fibers, or tows using alternating unitapes comprising different fibers, in accordance with various embodiments of the present disclosure.

FIG. 9 illustrates, in sectional view, an embodiment of a flexible composite material 903 comprising two or more monofilaments, fibers, or tows using alternating unitapes comprising different fibers, in accordance with the present disclosure.

Figure 10:
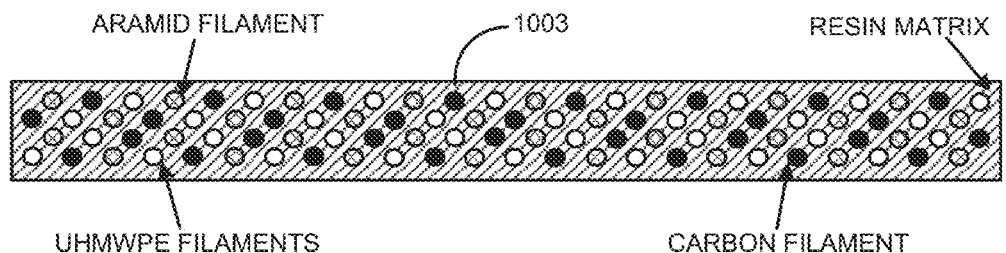
FIG. 10 shows a sectional view, diagrammatically illustrating an alternate flexible composite material made with two or more monofilaments, fibers, or tows using alternating unitapes comprising different fibers, in accordance with various embodiments of the present disclosure.

FIG. 10 illustrates, in sectional view, another embodiment of a flexible composite material 1003 comprising two or more monofilaments, fibers, or tows using alternating unitapes, in accordance with the present disclosure.

Alternate unitape embodiments can be made with two or more monofilaments, fibers, or tows, either by using alternating unitapes made from different fibers, (can be same class just different specs such as Dyneema SK78 and SK75), or by mixing fibers within a single unitape layer in a predetermined spacing or comingled pattern. In various embodiments, parameters such as strength, modulus, temperature resistance, cut resistance, tear or rip resistance, impact protection and energy absorbance, can be engineered or optimized, and costs can be minimized, using this concept. Typical engineering fibers include, but are not limited to, UHMWPE (e.g. Dyneema®), aramids (e.g. Kevlar®), liquid crystal polymers (e.g. Vectran®), carbon fiber of various grades, PBO (e.g. Zylon®), nylon, polyester (Rayon), PEN, Nomex and other fire proof, high temperature fibers, steel or other metal fibers, and combinations thereof.

Composite materials may include coloration of the matrix or membranes through use of pigments or dye sublimation. A fire retardant adhesive or polymer may be used, or fire retardants can be added to a flammable matrix or membrane to improve flame resistance. Examples of retardant additives include, but are not limited to, DOW D.E.R. 593 Brominated Resin, DOW Corning 3 Fire Retardant Resin, and polyurethane resin with Antimony Trioxide (such as EMC-85/10A from PDM Neptec Ltd.). Any other fire retardant additives may also be suitable. Fire retardant additives that may be used to improve flame resistance include Fyrol FR-2, Fyrol HF-4, Fyrol PNX, Fyrol 6, and SaFRon 7700, although other additives may also be suitable. Fire retardant characteristics and self-extinguishing features can also be added to the fibers either by using fire retardant fibers such as Nomex or Kevlar, ceramic or metallic wire filaments, direct addition of fire retardant compounds to the fiber formulation during the fiber manufacturing process, or by coating the fibers with a sizing, polymer or adhesive incorporating fire retardant compounds listed above or others as appropriate. Preferred woven or scrim materials used in the laminate may be either pretreated by a supplier to impart fire retardant properties, or the woven or scrim materials coated and/or infused with fire retardant compounds during the manufacturing process.

Anti-microbial/anti-pathogen resistance may be added to composite materials of the present disclosure by the incorporation of one or more of anti-microbial agents added or coated onto the polymer resins, or fabrics, and anti-microbial treatments to the fibers, monofilaments, threads or tows used for a composite material. Typical materials include OXiTitan antimicrobial, nano-silver compounds, sodium pyrithione, zinc pyrithione, 2-fluoroethanol, 1-bromo-2-fluoroethane, benzimidazole, fleroxacin, 1,4-butanedisulfonic acid disodium salt, 2-(2-pyridyl)isothiourea N-oxide hydrochloride, various quarternary ammonium salts, 2-pyridinethiol-1-oxide, compound zinc pyrithione, compound copper pyrithione, magnesium pyrithione, bispyrithione, pyrithione, α-Bromo Cinnam-Gel (ABC agent, e.g. from KFO France Co, Ltd.), and mixtures thereof. In various embodiments, fiber forms such as threads, tows and monofilaments can be treated with silver nano particles, or can have silver coatings applied via chemical or electrical plating, vacuum deposition or coating with a silver compound containing polymer, adhesive or sizing. Other anti-microbial/anti-pathogen materials not listed herein may also be suitable.

Various embodiments of a process comprising stretching one scrim layer over a mold and curing it in this position to form a flexible three dimensional composite part, is further demonstrated in the following disclosure relating to high-performance composite footwear components.

Figure 11:
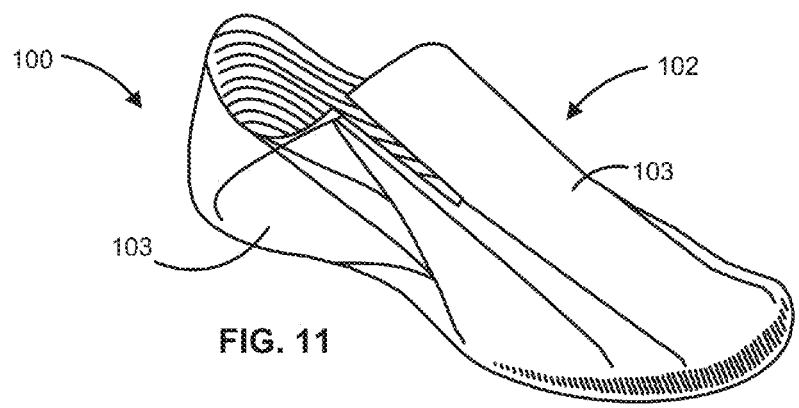
FIG. 11 shows a perspective view, diagrammatically illustrating a composite footwear upper, in accordance with various embodiments of the present disclosure.

FIG. 11 illustrates, in perspective view, an embodiment of a composite footwear upper 102 in accordance with the three-dimensional composite article system 100 of the present disclosure. In various embodiments, composite footwear upper 102 comprises flexible composite materials 103.

Figure 12A:
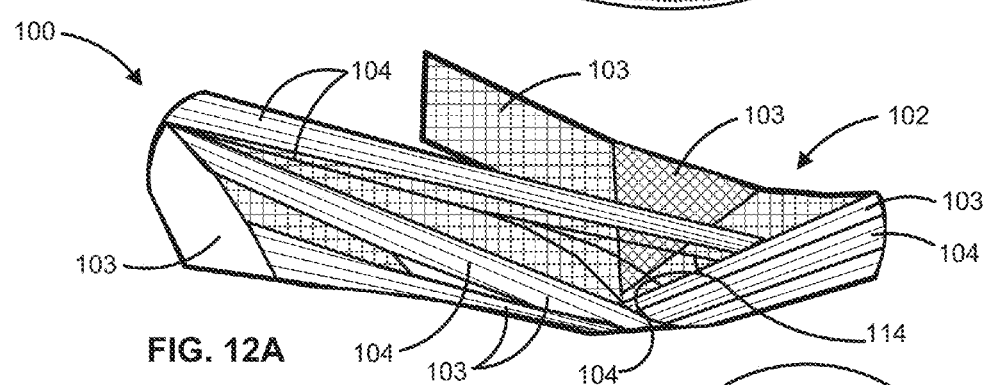
FIG. 12A shows a side view, diagrammatically illustrating an engineered composite footwear upper, in accordance with various embodiments of the present disclosure.

FIG. 12A shows a side view, diagrammatically illustrating an alternate embodiment of composite footwear upper 102, according to various embodiments of three-dimensional composite article system 100 of the present disclosure.

In various embodiments, the composite footwear upper 102 of the present system comprises substantially unitary upper-foot-supporting structures utilizing engineered arrangements of substantially flexible composite materials 103. Composite materials can be significantly superior to conventional materials in strength-to-weight ratio, which is one of the most important requirements of high-performance sports and athletic footwear. Thus, various embodiments described herein are particularly useful in the production of such footwear. Potential end-use applications of the described embodiments range from ultra-lightweight track shoes to extreme-performance mountaineering boots to military and industrial boots.

Footwear, in accordance with the various embodiments of the present disclosure, which comprise laminates of unitapes, give high-performance shoe designers a degree of design flexibility for technical engineering of reducing weight features, engineered implementation of directionally-tailored flexibility, the ability to make the material stiff or compliant in various different directions, engineered implementation of load paths, the ability to make the shoe upper in a one-piece molded "monocoque" structure, to manufacture the upper out of multiple two- or three-dimensional cut or shaped custom preforms or patterns cut from multidirectional broad goods laminated and bonded together, and the elimination of sewing and piece work construction and assembly of the shoe. This exemplary one-piece laminate design has major advantages in performance and the ability to engineer in controlled stretch, orthopedics, or support of the ankle by brace or strap.

In accordance with various embodiments, one-piece advantages include, but are not limited to, the following:

No sewing of major load paths seams needed, which is especially critical of lightweight shoes;

Potential elimination of mid-sole to provide continuous structure from one side of the shoe to the other, removing the requirement that the lower must have a structural portion on the lower side of the shoe transfer loads. This enables a decoupling of the design and integration of the upper and lower, which allows the lower to be more optimized for shock absorption, efficient transfer of muscle power, shock absorption and damping, and also allows the lowers to be made with less weight;

Allows sophisticated engineered design of the shoe monocoque for engineered stretch, breathability, load transmission, biometric integration, and ankle support for protection against injury, and the like;

Enables automated manufacturing of the shoe for cost and labor savings;

Enables the sophisticated engineering design of the shoe upper and the integrated manufacturing process allows the investment to be amortized across multiple model years and shoe platforms; and The design flexibility allows a monocoque to be used in a number of different styled shoes while still retaining the benefits of the engineering that went into the shoe design and manufacturing process.

For at least these reasons, performance of various embodiments of composite materials 103 in shoe applications is superior to conventional materials such as leather, synthetic leathers, mesh materials, and the like. In addition, flexible composite materials 103, and their manufacturing processes disclosed herein, can be tailored specifically to given design constraints.

Since the structural "chassis" of the shoe can be decoupled from the outer cosmetic surface engineering of the shoe, different "chassis" styles engineered for various applications can be combined with the outer "style," cosmetic, and surface engineering (for example, texture and surface grip, e.g. for kicking a soccer ball). By this method, it is possible to produce shoes that look and have surface characteristics that are similar but have very different "chassis tuning" or structural layout, which can be used to maintain a branded cross platform look or style.

Using trade studies, detailed analysis, and physical experimentation, a range of composite uppers are obtained, which provide substantial reductions in component weights without sacrificing strength. Flexible composite materials 103 of the present system can be configured to efficiently accommodate the anticipated force loading while providing appropriate levels of mechanical compliance consistent with appropriate functioning of the component. Furthermore, various embodiments of the present system are cross-compatible between applications; that is, a single upper design may be adapted to multiple end-use applications.

Figure 12B:
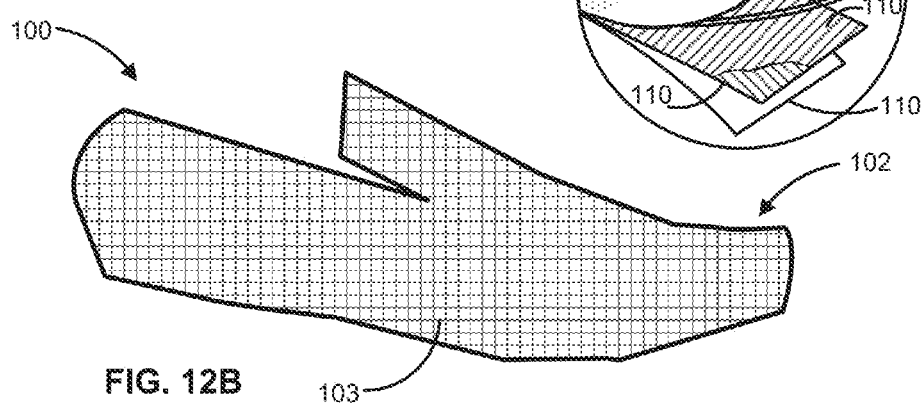
FIG. 12B shows a side view, diagrammatically illustrating an engineered composite footwear upper, in accordance with various embodiments of the present disclosure.

Referring to the illustration of FIG. 12A, various embodiments of composite footwear uppers 102 of the present system comprise engineered placements of reinforcing fibers 104 located along critical load paths 106 within the component. Such load paths 106 can be identified using computer analysis (e.g., three-dimensional finite element analysis, and the like) and/or physical testing. Other regions of the upper are engineered to provide increased compliance, for example, to accommodate the biomechanical articulation of the wearer's foot. Referring to the illustration of FIG. 12B, alternate composite footwear uppers 102 of the present system comprise comparatively isotropic arrangements of reinforcing fibers 104. In both exemplary embodiments, the resulting composite structures achieve low structural weight while maintaining appropriate levels of strength, support, and durability. Furthermore, various fabrication methodologies in accordance with the present disclosure maintain high levels of constructability, as will be described in more detail herein below.

Figure 13:
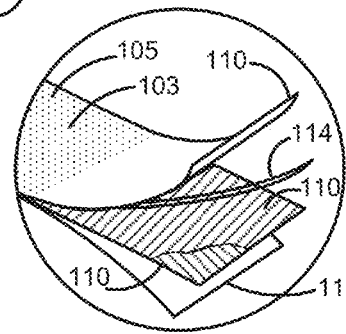
FIG. 13 shows a partially exploded diagram illustrating a preferred composite construction consistent with the construction of the composite footwear upper of FIG. 11, in accordance with various embodiments of the present disclosure.

FIG. 13 shows a partially exploded diagram illustrating an exemplary composition of flexible composite material 103 consistent with the construction of the composite footwear upper 102 of FIG. 11. In various embodiments, composite composition 103 generally comprise high drape and draw fabrics where the individual layers have been combined in a manner that forms a single unified composition. In various embodiments, the flexible composite comprises at least one or more structural layers 110 of reinforcing material. Various embodiments of flexible-composite compositions 103 comprise multiple material layers consisting of, for example, continuous surface layers and/or fiber-reinforced layers such as scrims, and/or engineered arrangements of individual fiber tows 114, as shown. The multiple layers 110 are preferably configured to comprise multi-directional load-handling capability. In various embodiments, flexible composite compositions additionally comprise one or more non-structural "performance-modifying" layers 110. In various embodiments, composite composition 103 may further comprise a texturing and/or coloring 105 applied to or absorbed into an outer surface layer 110.

In various embodiments, flexible-composites may comprise layers 110 having substantially identical material composition. In various other embodiments, flexible-composites may comprise layers 110 having various material weights, mechanical properties (compliance), and other properties. In various embodiments, composite footwear upper 102 comprises one or more layers 110 of non-woven unidirectional (UD) fibers and polymer matrix plies oriented in one or more directions. In various embodiments, a composite layup may comprise layers 110 consisting of both structural and non-structural materials.

Various reinforcement types include, but are not limited to: prepreg unitapes; unitows (prepreg or raw-fiber single-tow reinforcements placed along specific load paths); B-staged woven and nonwoven composites; C-staged woven and nonwoven composites; prepreged or dry woven fabrics; one or more layers of prepreged or dry fiber non woven spread or unspread oriented unidirectional sheet or layers stitched, tacked or bonded to form broad goods cloth: one or more layers of prepreged or dry fiber cloth made of spaced or unspaced spread or unspread unitows in oriented unidirectional sheet or layers stitched, tacked or bonded to form a broadgood fabrics; two or three dimensional prepregged or dry reinforcement preforms; thermoplastic matrix prepreg unitape, unitow, woven and non woven composites or engineered preforms as above with thermoplastic or hybrid thermoplastic; thermoset resin matrix matrix; nanofilament, nao fiber, nano particle reinforcement and structural membranes; uniaxially oriented sheet products such as drawn, tensilized "tensilion" UHMWPE in sheet in single layer, multiple oriented layers bonded using a suitable adhesive and then incorporated in a manner generally analogous to unitapes; or said tensilized or oriented sheet slit to form unitows and incorporated dry or with a suitable adhesive or coating; and, combinations thereof.

Various reinforcing fibers/fabrics usable in the present system include, but are not limited to, nylon, polyester, ultrahigh molecular weight polyethylene (UHMWPE) (e.g., Spectra® and Dyneema®), para- and meta-aramids (e.g., Kevlar®, Nomex®, Technora®, Twaron®), liquid crystal polymer (LCP) (e.g., Vectran®), polyimide, other synthetic polymers (e.g. polybenzoxazole (PBO), polybenzimidazole (PBI), polyimide benzobisthiazole (PIBT), poly(p-phenylene benzobisthiazole) (PBZT), polylactic acid (PLA), poly(p-phenylene terephthalamide) (PPTA), amongst others), metal fiber, glass fiber, carbon fiber, or combinations thereof.

Upon reading this specification, those with ordinary skill in the art will now appreciate that, under appropriate circumstances, considering such issues as design preference, user preferences, cost, structural requirements, available materials, technological advances, and the like, other reinforcement arrangements now known or herein afterwards developed, such as, for example, use of rigid or semi-rigid load transfer members, inserts, application of new coatings, and the like, may also suffice.

As exemplary components are engineered for specific applications, the stacking sequence of constituent material layers 110 may vary between embodiments. That is, the particular layup configuration of a composite laminate, with regard to the angles of layup, the number of lamina at each angle, and the exact sequence of the lamina, may vary as desired for a particular application. For example, as discussed herein above, three layer 0°/90°/45° relative orientations of material layers is just one useful embodiment out of an infinite number of possible orientations. Nonstructural material layers 110 can be utilized when a particular visual or non-structural physical property is required (such as, for example, surface texture, wear resistance, UV protection, abrasion resistance, color, reflectivity, and the like). As one preferred example, a "soft" inner layer 110 is often incorporated within the interior of composite footwear upper 102 as a liner adjacent the wearer's foot.

Examples of nonstructural materials include, but are not limited to: nonwoven fabrics (nonstructural, short fiber random felt); woven fabrics; various "soft" liner materials including, for example, non-woven material (nonstructural short fiber random felt), spunbonds (pregged), and tricot fabrics; nonstructural membranes (waterproof/breathable, interstitial isolators, and the like); nonstructural coatings; design appliqués; and various elastomeric materials used for shock absorption, damping, or for various other purposes.

Nonstructural layers 110 may be disposed at any selected layer position of a composite, as required, for example, by the design and performance criteria. In various applications, nonstructural layers may be omitted entirely.

For footwear in general, it may be desirable to have controlled flexure built into a shoe, such that some parts of the shoe are soft and compliant. Such flexure can allow optimum freedom and range of motion at an articulated joint such as the ankle area. In various other applications, flexure and compliance may enhance, control, or in the case of protection from injury, restrict or limit the range of motion in one or more directions, either simultaneously or separately, to perform an intended purpose or function relating to the particular sport or footwear application.

An example is an ultra-light basketball shoe designed to exhibit engineered structure for load optimum load transfer and response to cutting-, sprinting- and jumping-type motions combined with engineered compliance throughout the range of motion of the ankle normally used by the athlete, but with built in ankle bracing that does not limit mobility or restrict motion in the normal range of motion, but rather acting to brace the ankle and limit motion or ranges of motion where injury occurs such excessive rotation or rolling over or under due to catching or twisting of the foot.

The athlete's physical performance may be enhanced because the ultra-light weight of the shoe and freedom of motion in the normal range of motion combine to reduce fatigue. The engineered compliance and load paths can provide more efficient conversion of muscle response to athletic performance while providing shock and impact absorption, ankle joint support and controlled restriction of motion in undesirable ranges of motion such as rotation and the twisting along with limiting the range of motion in normal directions to prevent injury causing hyperextension of the joint in injury producing direction modes.

Systems based on multidirectional oriented unitapes can exhibit anisotropic material properties that facilitate the engineering of such engineered compliance systems while simultaneously realizing the benefits of the use of very high strength and high modulus engineering fibers that would otherwise produce an upper that is too stiff or heavy for practical use. Unitapes can have unidirectional monofilaments all oriented in substantially one direction. In the direction along the fiber monofilaments, the unitape may be very strong and exhibit minimal stretch due to the high Young's Modulus of the monofilaments. In the direction perpendicular to the monofilaments, there may be no reinforcement so that the stretch in that direction is governed by the properties of the elastomeric matrix. In general the properties may be very compliant or "stretchy" and able to undergo large deformations and recover from those deformations repeatedly without damage or degradation to the matrix.

By using two or more of unitapes comprising an elastomeric matrix, with the unidirectional reinforcement oriented in the directions that strength and low stretch is desired and leaving the directions where compliance is desired unreinforced, the resulting laminate can be made selectively stiff with low stretch along the fiber axis of each unitape yet compliant in directions where there are no directionally reinforcing fibers.

This selective compliance can be enhanced by optionally adding a thin interlayer of elastomer between each unitape layer to allow the unitapes to rotate or hinge slightly within the complaint interlaminar elastomeric layer, which allows more control of the off-directional compliance, facilitates larger deformations, and provides the ability to tune the laminate response by the use of various grades of elastomer with different types of viscoelastic response.

Compliant interlayers can have single or combination of the following properties: (1) High energy restorative to impart spring like properties to the deformed laminate to permit the laminate to store and restore elastic energy; (2) High loss and energy absorbance to absorb and diffuse shocks and impacts; (3) Viscoelastic damping to control the transient response to transient dynamic; and/or (4) Rate sensitivity such that the matrix properties either stiffen or become more compliant in response to rapidly applied transient loads and shocks.

The properties of the composite may be predicted and designed using adaptations of aerospace unidirectional composite materials suitably modified for the incorporation of compliant, nonlinear property matrix material properties and large, nonlinear geometric and material deformations.

Due to the non-linearity in the system, the on-axis fiber dominated properties and especially the matrix dominated properties of transverse matrix dominated direction, and the matrix dominated shear directions should be determined semi-empirically by making up sample laminates and testing to get the nonlinear stress/strain relationships for the transverse matrix dominated direction and the shear direction.

These properties can be used as input parameters for the analysis procedure listed below. Although this procedure is tailored to rigid laminates if the non-linearity is considered and the deformations are within acceptable parameters the strength and stretch vs load in any arbitrary direction can be closely approximated.

Useful constitutive equations of a unidirectional fiber-reinforced layer, and other physical and mathematic information useful in design processes in accordance with various embodiments of the present disclosure, may be found in various technical books relating to the subject of laminated composites. One such book on the topic of Finite Element Analysis is "The Finite Element Method" by Thomas J. R. Hughes, and a book on properties and analysis of composite materials in "Introduction to Composite Materials," S. W. Tsai and T. H. Hahn.

As noted above, the physical properties of various embodiments of flexible composite materials 103 are generally isotopic (having substantially the same physical properties irrespective of the direction). Alternately, to provide specific engineered control of force loads (and other performance factors), physical properties of the composite compositions can be anisotropic, having non-uniform mechanical and or other physical properties designed to structurally optimize the performance of the composite footwear upper for a specific application.

The above-noted flexible composite materials 103 can include both breathable and non-breathable compositions, or non-porous, porous or air permeable compositions or material product forms, as required by the application. Furthermore, various flexible composite materials 103 may be clear, opaque, colored, imprinted, or may preferably comprise any combination of the aforementioned visual arrangements. Multiple colored layers and cutouts may be used to produce colored patterns.

In various embodiments, both the reinforcing and non-reinforcing materials forming the composite layup can be encapsulated within a polymer matrix 105. In various embodiments, the composite layups are consolidated, formed and cured or fused/bonded in the case of thermoplastic or non-crosslinking systems, for example, utilizing combinations of heat and pressure.

Figure 14:
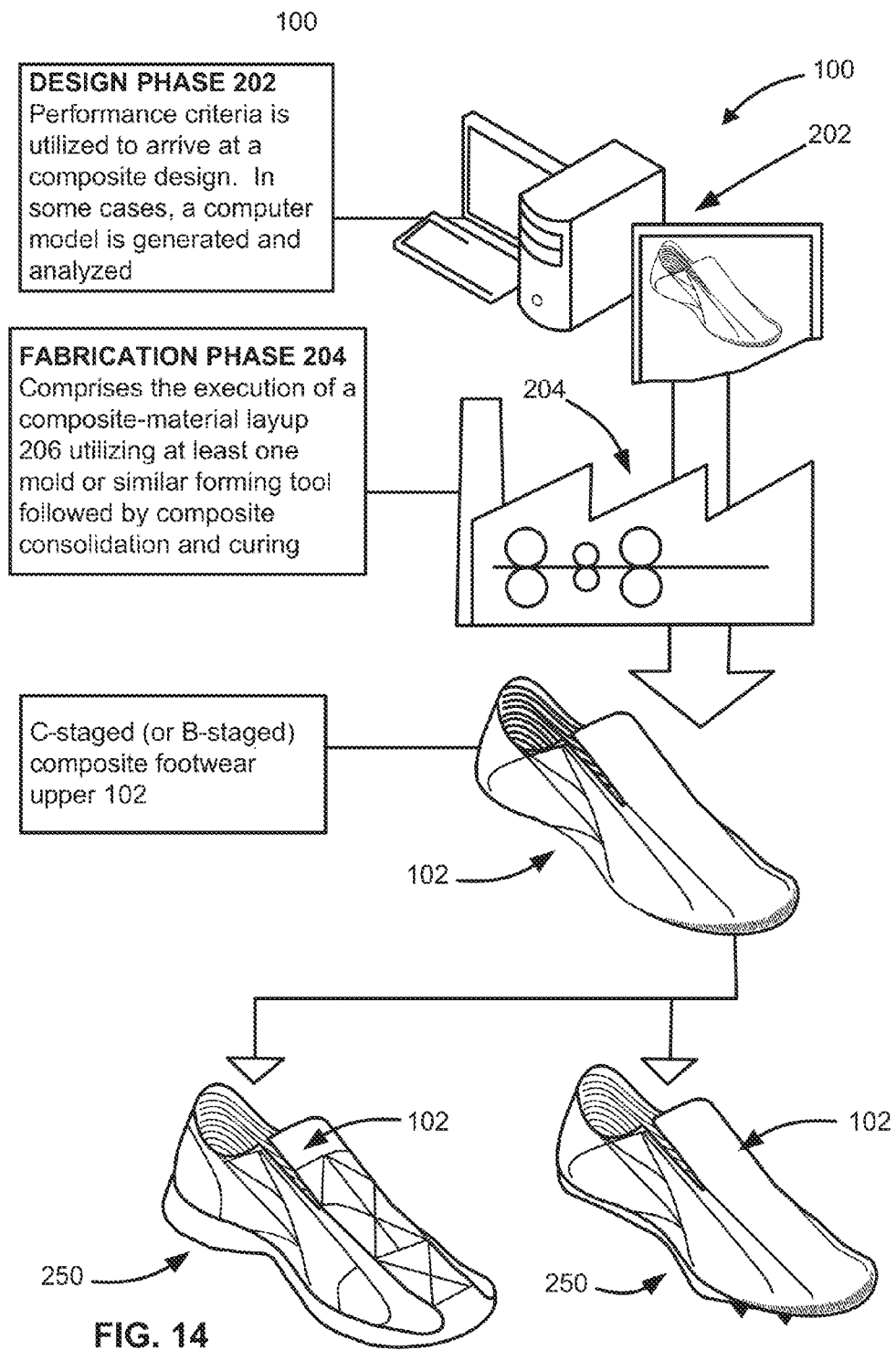
FIG. 14 shows a diagram generally illustrating preferred methods of producing a modular engineered composite footwear upper usable in multiple shoe applications, in accordance with various embodiments of the present disclosure.

FIG. 14 shows a diagram generally illustrating methods of producing modular engineered composite footwear uppers 102 usable in multiple shoe applications. The upper is produced in a multistep process comprising design and fabrication steps. Design phase 202 and fabrication phase 204 can be computer assisted. The fabrication phase 204 may implement at least one automated fabrication process.

In various embodiments, at least one computer-aided design is produced for each unique configuration of composite footwear upper 102. During the design phase 202 performance criteria is utilized to arrive at a composite design. In some cases, a computer model is generated and analyzed to understand the performance of the upper under various loads and boundary conditions. Such a computer model, perfectly utilizing finite element analysis, assists in optimizing the new design by predicting, via computer simulation, the behavior of structures under various field conditions. Once the computer design is optimized, one or more prototypes may be generated for physical testing. The composite footwear upper 102 is concurrently, or subsequently, analyzed for manufacturability, including production-cost analysis, material availability, storage stability analysis, and the like. Formability, conformably and drapabilty if the upper is in a flat configuration, and additional 3-D forming steps, are envisioned. If conventional shoe industry lasting construction methods are envisioned, the design and analysis can also used to provide enhanced formability suitable to current industry fabrications methods and existing tooling and production equipment. If the performance of the prototype is consistent with performance and manufacturing criteria, the upper component design moves to fabrication phase 204. Commercially available analysis packages suitable for such analysis and design include, but are not limited to, NASTRAN, Abaqus, ANSYS, and PATRAN.

One or both of the design phase 202 and fabrication phase 204 can include the development of computer-aided design data usable in the automated fabrication of the preferred composite-material upper. An exemplary fabrication sequence is described in a subsequent section of the present disclosure.

Once fabricated, the composite footwear uppers 102 are in condition to be integrated within one or more end-use products 250, as shown. In various embodiments, the finished upper components can be stored for future use or immediately advanced to a subsequent fabrication step or advanced directly to integration within a finished product. The use of a single upper design allows the time and cost associated with the initial design/analysis of the upper to be shared between multiple end products.

Upon reading this specification, those with ordinary skill in the art will now appreciate that integration of the upper into a finished product involves additional fabrication steps, as generally described in a later section of the present disclosure. It is further noted that, depending on the nature of the end-use application, the subsequent integration of the upper into a finished product may also involve one or more additional design steps.

Figure 15:
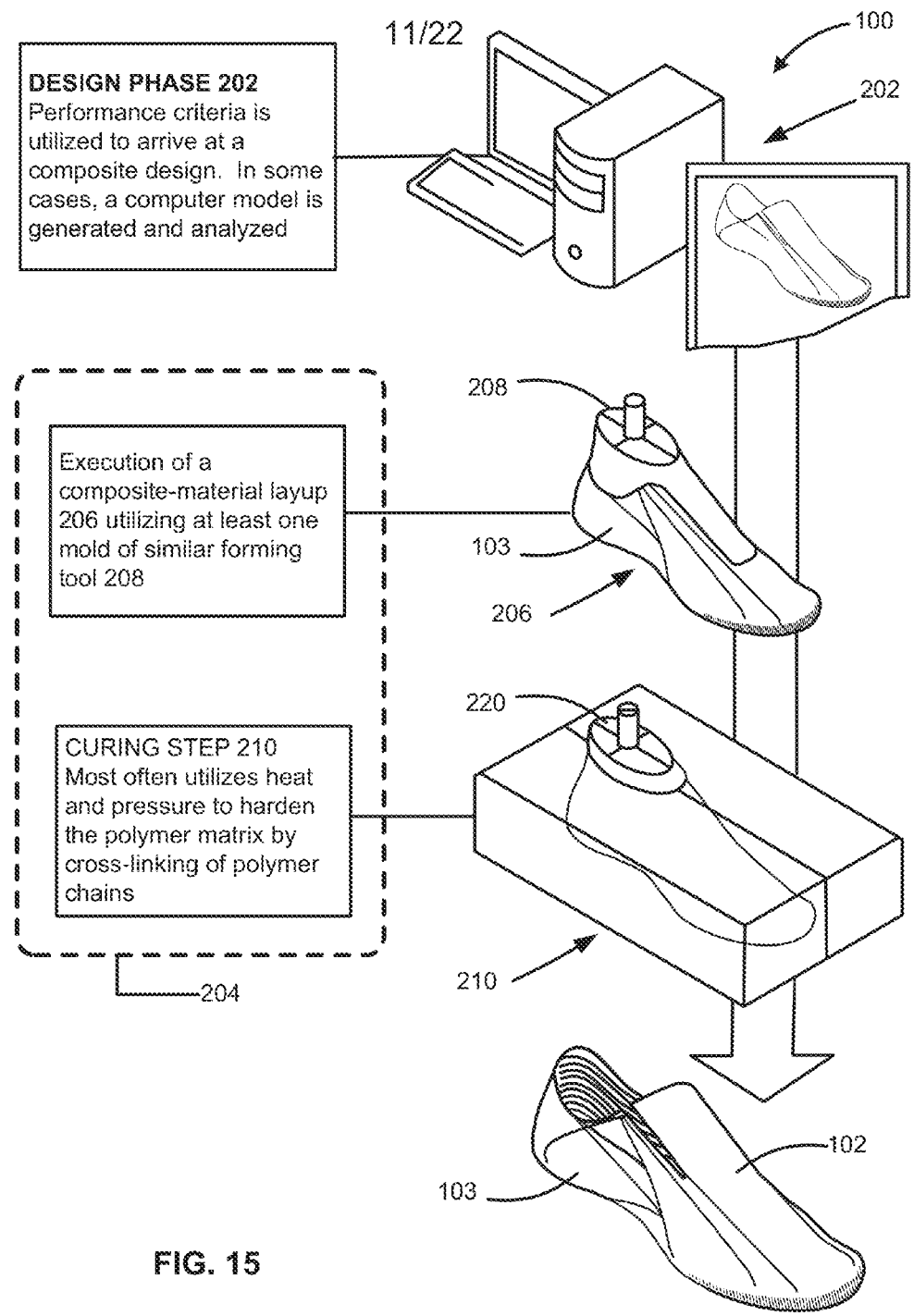
FIG. 15 shows a diagram generally illustrating one preferred method of producing the composite footwear upper of FIG. 11 in accordance with various embodiments of the present disclosure.

FIG. 15 shows a diagram, generally illustrating an embodiment of a method of producing the composite footwear upper of FIG. 11. FIG. 15 illustrates a design phase 202 followed by a fabrication phase 204. Fabrication phase 204 comprises the execution of a composite-material layup 206 utilizing at least one mold or similar forming tool 208, as shown. Fabrication phase 204 further comprises at least one curing step 210, as shown. Curing step 210 can utilize heat and pressure to harden the polymer matrix by cross-linking of polymer chains. In various polymer chemistries, curing may be brought about by chemical additives, ultraviolet radiation, electron beam, and other processes. Alternately, thermoplastic matrix materials can be heat formed and multiple layers heat fused or bonded, ultrasonically or laser welded. Thermoplastic hot melts, reactive polyurethane adhesive systems, may be bonded using solvent welding techniques, contact adhesives, or crosslinking or non crosslinking adhesives or other suitable methods. If crosslinking adhesive is used, curing methods for crosslinking listed above may be used.

In general, curing techniques include, but are not limited to, pressure and temperature; pressure and radiation; and, pressure and radiation cure with heat, or combinations thereof.

In general, heating methods include, but are not limited to, heated caul; radio frequency; E-beam; induction heating; and, an oven, or combinations thereof.

Figure 16:
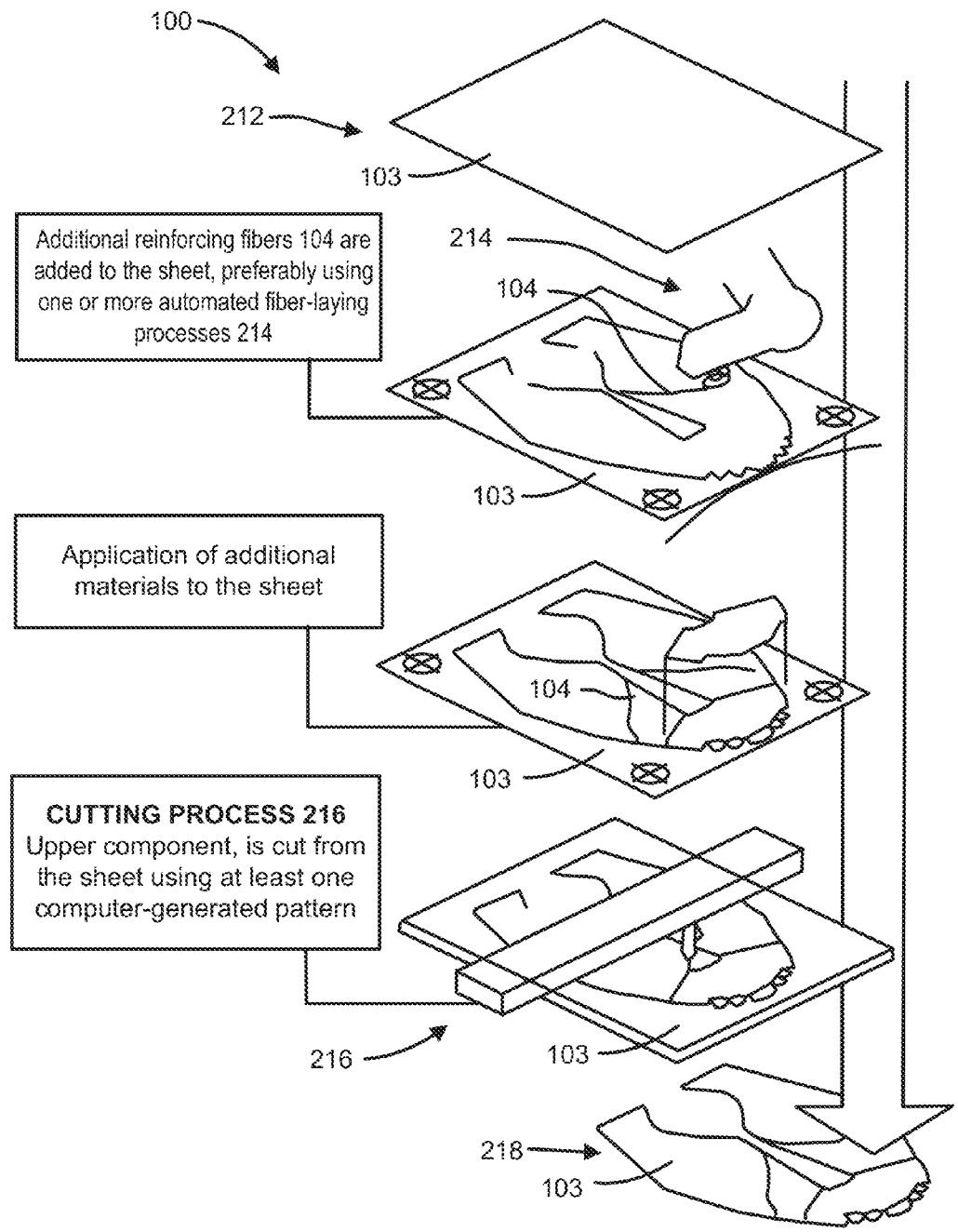
FIG. 16 shows a diagram generally illustrating a set of initial fabrication steps employed in the production of the composite footwear upper of FIG. 11, in accordance with various embodiments of the present disclosure.

FIG. 16 shows a diagram, generally illustrating one example set of initial fabrication steps employed in the production of the composite footwear upper 102 of FIG. 11. In this sequence, selected flexible composite materials 103 are provided in the form of planar sheets 212. Planar sheets 212 may comprise any of the previously-described structural and nonstructural precursor materials. Planar sheets 212 may consist of raw-fiber compositions or may comprise prepreg B-staged (or C-staged) precursor composites.

In one or more subsequent steps, additional reinforcing fibers 104 can be added to the sheet, for example, using one or more automated fiber-laying processes 214. Additional fiber placements can be engineered to anticipate load paths, compliance requirements, and the like. The use of "radi-used" fiber placements prevents kinking within the composite fabric, and in some applications, provides stable as-designed load paths. In various applications, single fiber tows or narrow multi-fiber tapes can be sandwiched between material layers 110 to enhance load transfer. Alternately, additional reinforcements may be manually applied. Optional steps include the application of additional materials to the sheet. Such additional materials may comprise structural or nonstructural fiber elements, preformed inserts, cushions, graphical appliqués, printing, etc.

Next, the sheet is advanced to a cutting step utilizing at least one automated cutting process 216. In this step, a section of the sheet, which will eventually form the upper component, is cut from the sheet, such as by using at least one computer-generated pattern developed during the design process. Alternately, cutting may be manually executed. Alternately, cutting may be executed at any previous point in the sequence.

Various automated cutting methods include, but are not limited to: rotary knife (i.e., mechanical); ultrasonic; laser; die-cut; water jet; and combinations thereof.

In some applications, it is preferred that registration markings be applied during cutting steps to facilitate subsequent fabrication processes, as shown. It is further noted that the above-described fabrication steps may alternately be executed in combination with a preformed tool, such as a male last or female mold.

Figure 17:
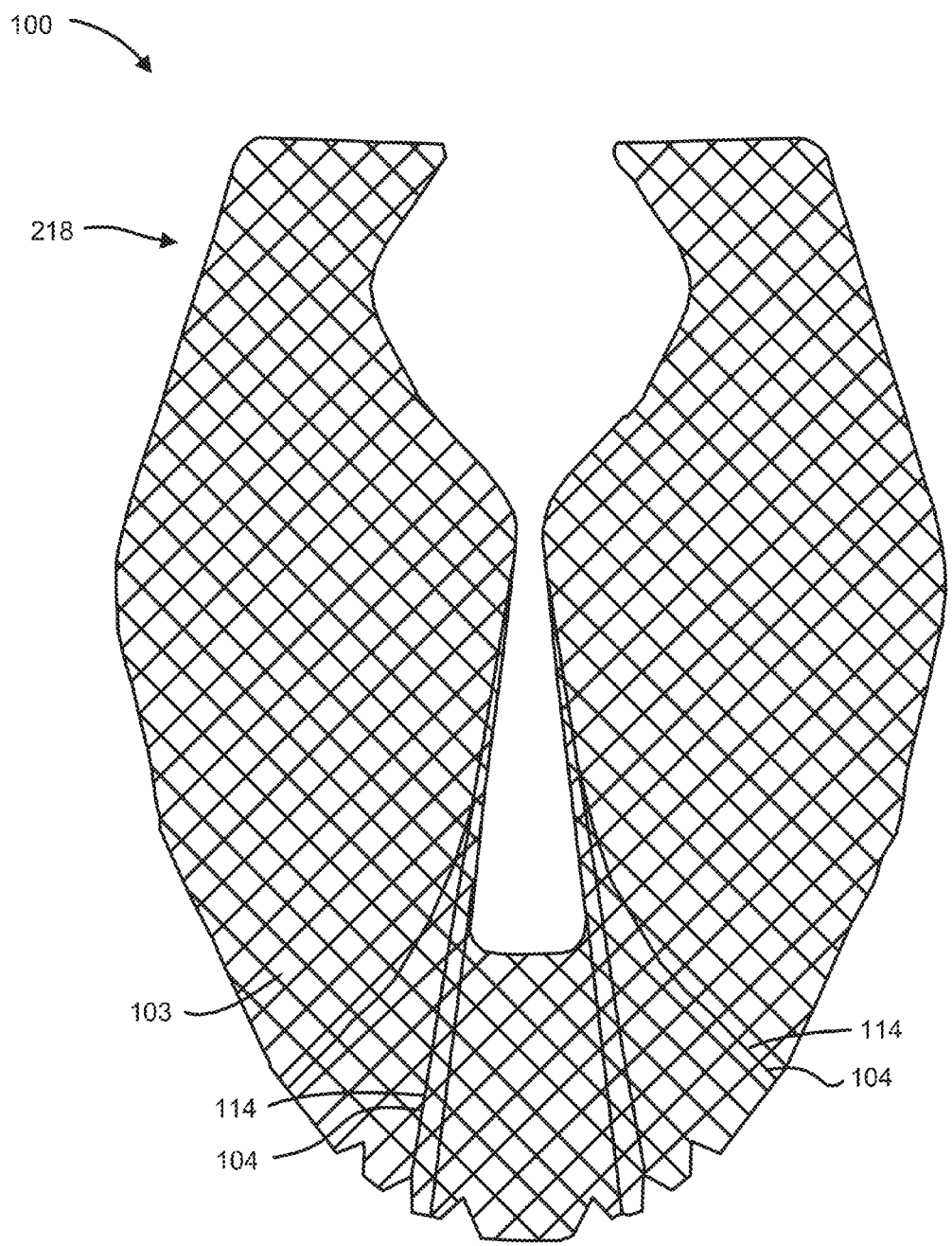
FIG. 17 shows a plan view, diagrammatically illustrating a planar composite component capable of forming a composite footwear upper, in accordance with various embodiments of the present disclosure.

FIG. 17 shows a plan view, diagrammatically illustrating a planar composite component 218 capable of forming composite footwear upper 112, according to one embodiment of the present disclosure. It is noted that upper patterns may comprise additional features not depicted in the diagrammatic illustration of FIG. 17.

Figure 18:
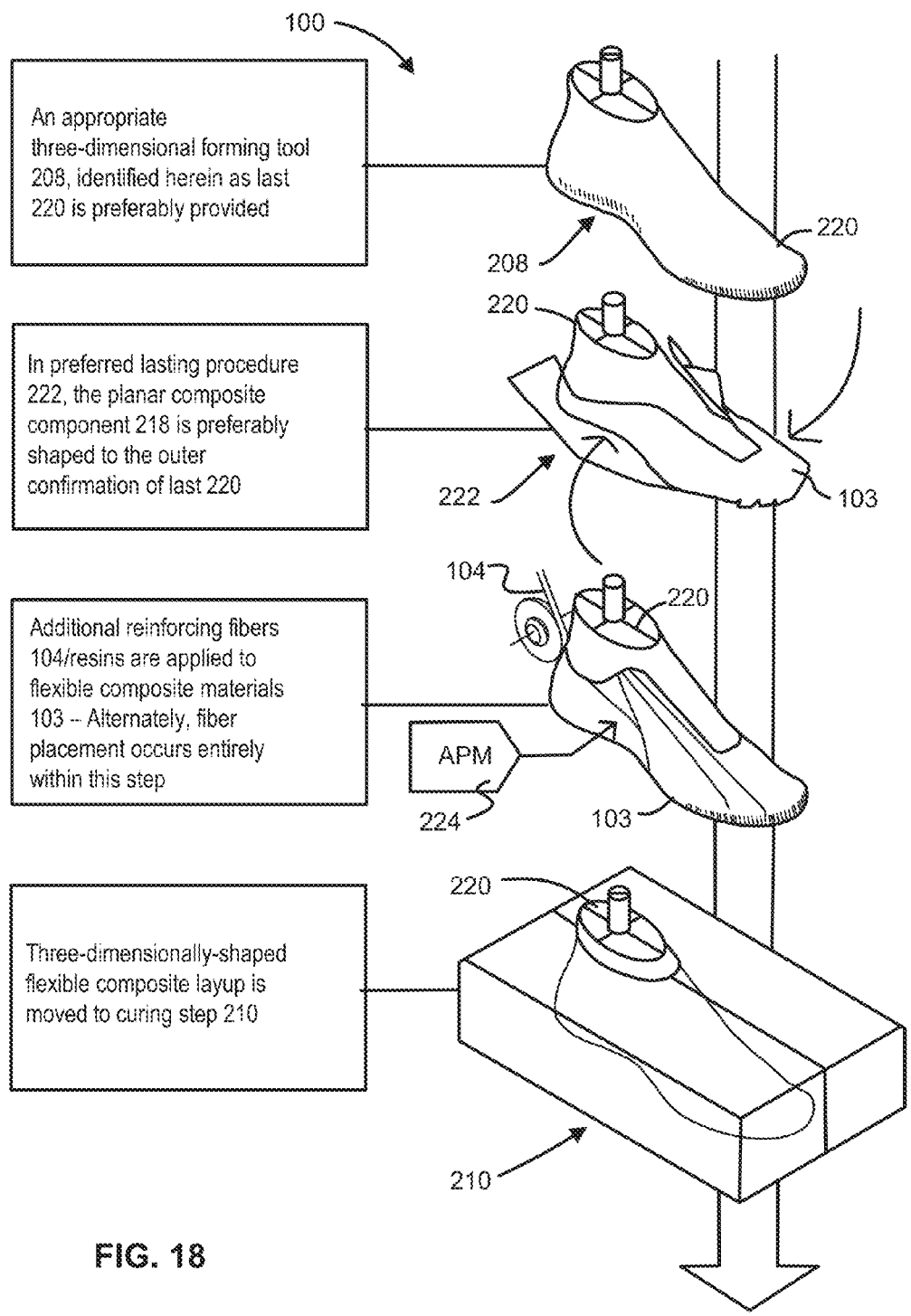
FIG. 18 shows a diagram generally illustrating a set of subsequent fabrication steps employed in the production of the composite footwear upper of FIG. 11, in accordance with various embodiments of the present disclosure.

FIG. 18 shows a diagram, generally illustrating a set of subsequent fabrication steps employed in the production of composite footwear upper 102 of FIG. 11. An appropriate three-dimensional forming tool 208, identified herein as last 220 is provided. In the lasting procedure 222, the planar composite component 218 is shaped to the outer confirmation of last 220, such as by using one or more automated lasting processes. Alternately, the flexible composite materials may be applied to last 220 manually.

In various embodiments, the constituent materials may be held to the last using vacuum-assisted adhesion. Alternatively, temporary adhesives may be used to temporarily position and hold the material adjacent the forming tool. For example, last 220 may be coated with a release material followed by one or more adhesive sizing materials to hold the material adjacent the last (such materials being compounded to break down or wash out of the composite material).

On completion of lasting procedure 222, the three-dimensionally-shaped flexible composite layup is moved to curing step 210, as shown. In various procedures, curing step 210 is performed with the upper positioned over last 220. In an alternate embodiment, last 220 is removed prior to curing.

In an alternate step of lasting procedure 222, additional reinforcing fibers 104 are applied to flexible composite materials 103 during the lasting procedure 222 (and prior to curing). In an alternate step of lasting procedure 222, additional polymer adhesives 224 are applied to flexible composite materials 103. In such an alternate step, the uncured upper component may comprise combinations of prepreg and raw fibers necessitating the application of additional adhesive polymers 224, thus assisting subsequent consolidation of the constituent materials into a unified composite component. Various useful adhesive-polymer resins include thermosets and/or thermoplastics.

Adhesives can be applied to the fibers utilizing one or more of the following non-limiting application techniques: spraying; dipping; thermal films; thermoplastic films; resin injections; and dry powder coating; and combinations thereof.

In various other embodiments of the lasting procedure 222, all constituent materials (fibers, membranes, etc.) are applied to the last tool (or alternately, the female mold) in an automated fiber placement process. In this alternate lasting process, single-tow fibers and/or sheet fabrics are applied to the last or mold tool, thus omitting the flat-material fabrication steps depicted in FIG. 16.

Upon reading this specification, those with ordinary skill in the art will now appreciate that, under appropriate circumstances, considering such issues as design preference, fabrication preferences, cost, structural requirements, available materials, technological advances, etc., other layup and lasting arrangements such as, for example, integrating additional preformed patches, spacers, toe bumpers, elastomeric inserts, cloth or leather outer surface layers, and similar features with the layup prior to curing of the upper component, etc., may suffice.

Thus, as described above, layup of the composite upper is accomplished by one or more of the following non-limiting list of techniques: automated layup; manual layup in combination with automated layup; fully manual layup for low-volume or custom work; flat layup (as generally depicted and described in FIG. 16); partial preform layup; layup on male last (single-tow placement and/or fabric draped); layup within a female tool (single-tow fiber placement and/or fabric draped); and automated "on-tool" layups (whereby all fiber placement occurs on the last or mold tool); and, combinations thereof.

Figure 19:
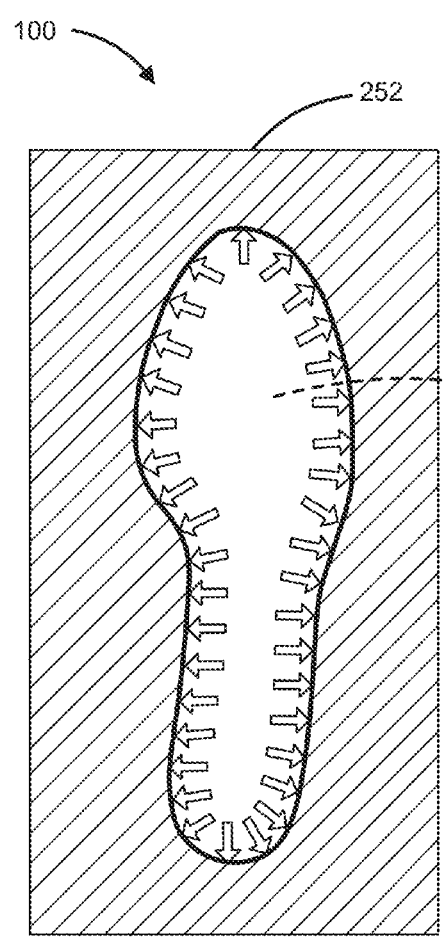
FIG. 19 shows a schematic diagram generally illustrating a first consolidation and curing methodology employable in the production of the composite footwear upper of FIG. 11, in accordance with various embodiments of the present disclosure.

FIG. 19 shows a schematic diagram, generally illustrating a first consolidation and curing methodology employable in the production of the composite footwear upper of FIG. 11. In this example, a hard female tool 252 is used to implement a female-mold curing process. In this fabrication technique, internal (i.e. outward) pressure is used for consolidation.

In exemplary female-mold curing processes, the composite layup is located within the cavity of the female tool 252, between the inner surfaces of the female mold and a hydroform-type mandrel, inflatable diaphragm, or similar elastomeric bladder. A pressurized fluid is preferably used to inflate the elastomeric tool and press the composite layup against the interior surfaces of female tool 252. In most cases, the fluid and/or tool is heated to facilitate curing of the adhesive polymer matrix. Once the curing cycle is complete, the inflatable elastomeric tool is deflated and the cured or B-staged upper component is removed from female tool 252. It is noted that this exemplary technique, as diagrammatically depicted in FIG. 19 (and, in other embodiments, such as illustrated in FIGS. 7a-c), is well-suited for production of composite uppers requiring intricate external details or finished outer appearance.

Alternately, an inflatable last 220 is used in combination with female tool 252. In this case, the last is sufficiently rigid to permit layup during lasting procedure 222 (e.g., see FIG. 18), while preferentially maintaining the ability to collapse sufficiently to be removable from the finished upper component.

Figure 20:
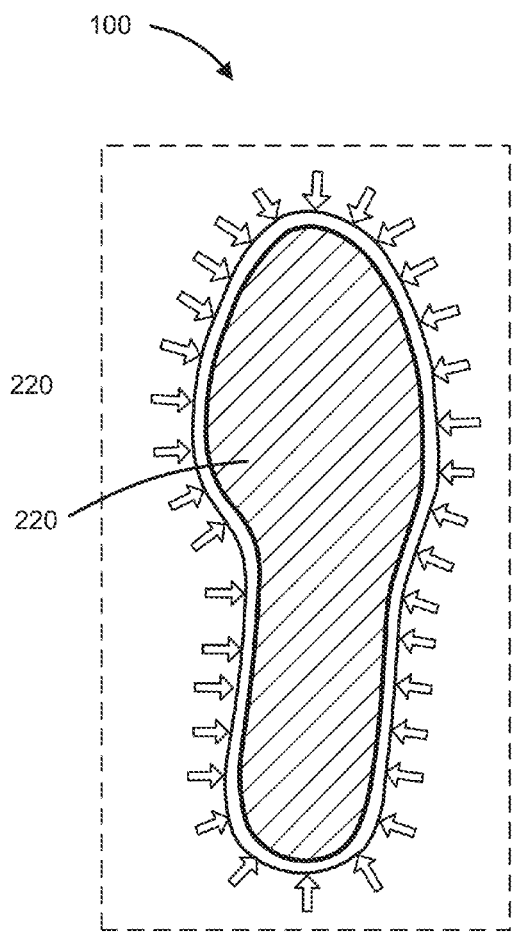
FIG. 20 shows a schematic diagram generally illustrating a second consolidation and curing methodology employable in the production of the composite footwear upper of FIG. 11, in accordance with various embodiments of the present disclosure.

FIG. 20 shows a schematic diagram, generally illustrating a second consolidation and curing methodology employable in the production of the composite footwear upper of FIG. 11. FIG. 20 generally depicts a male mold process utilizing, for example, the substantially rigid male last 220. In this exemplary fabrication technique, external pressure is used for consolidation of the composite materials. This technique is useful for providing smooth inside surfaces within the upper component.

Such male-tool processes can include the implementation of vacuum bags, elastomeric external bladders, mold boxes (using either pressure or thermal expansion for consolidation pressure), and the like. The system may be compatible with curing within a vacuum and/or atmospheric autoclave. Various embodiments of the rigid male last 220 comprise an arrangement of vacuum ports to provide vacuum-assisted layup (e.g. to hold constituent materials to the last during the layup and lasting procedures). This technique is also adaptable to utilize superplastic forming techniques and other similar pressure or vacuum forming techniques to form flat sheets of unidirectional laminates in un cured, B-staged, C-staged or heat formable thermoplastic matrix broad goods or engineered flat preforms into a three dimensional shape for direct use on a shoe or as a three dimensional formed preform for application onto the shoe form tool, last, or mandrel.

Figure 27:
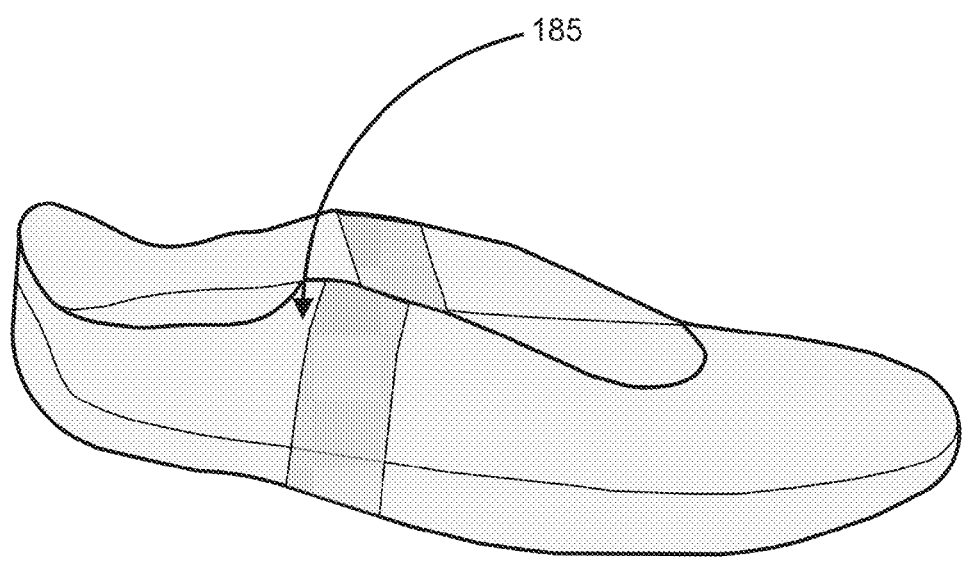
FIG. 27 shows an embodiment of a super plastic forming type system, in accordance with various embodiments of the present disclosure.
Figure 28:
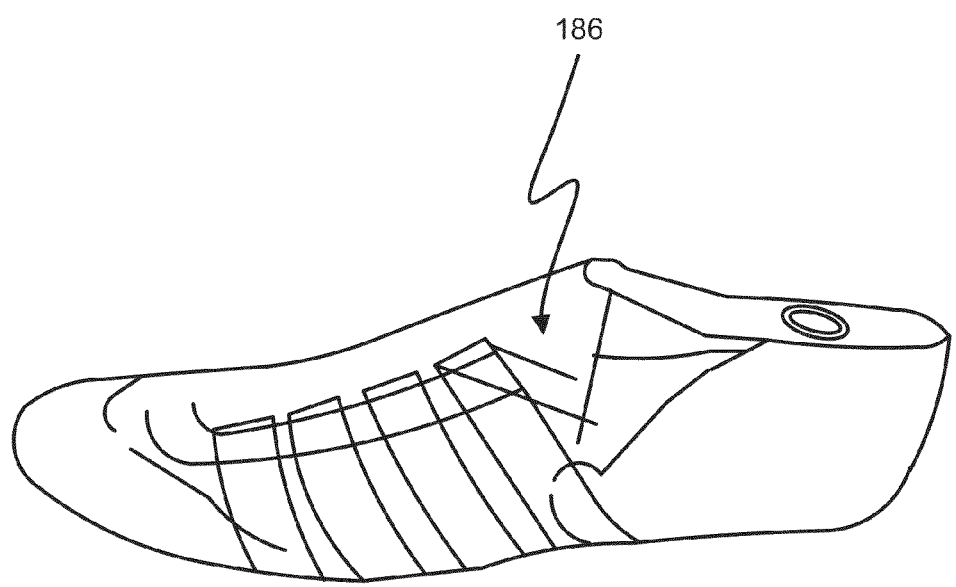
FIG. 28 shows an embodiment of a ply-by-ply layup of unitape layers and other structural elements onto a male form tool, in accordance with various embodiments of the present disclosure.
Figure 29:
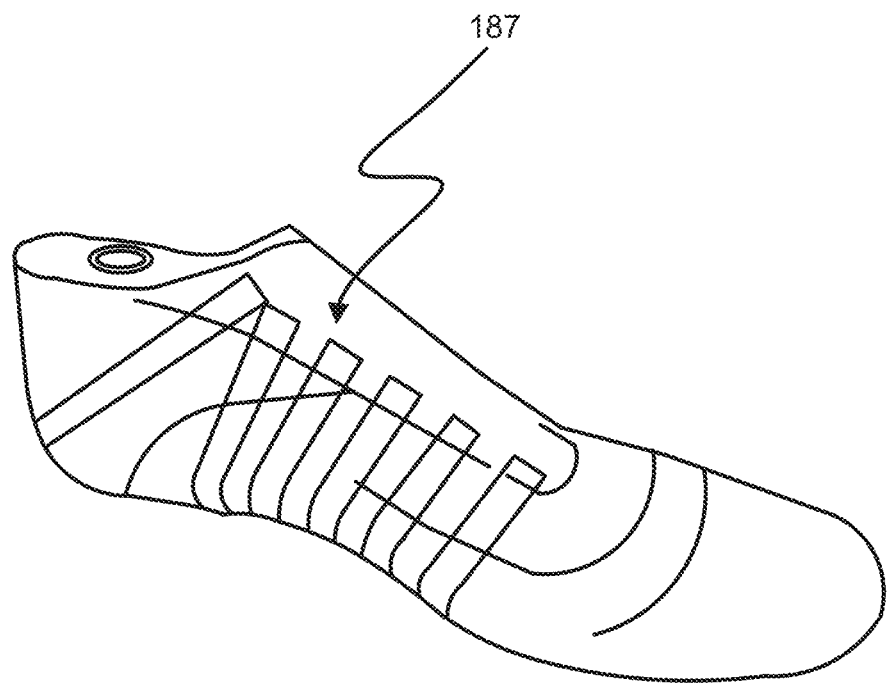
FIG. 29 shows another embodiment of a ply-by-ply layup of unitape layers and other structural elements onto a male form tool, in accordance with various embodiments of the present disclosure.

An embodiment of a super plastic forming type system is shown in FIG. 27. In FIG. 27, an upper 185 comprises plastically formed flat sheet(s) of multidirectional broad goods with a thermoplastic matrix cut into patterned panels, formed into 3D shapes, and laminated together, such as in a one-step operation. FIGS. 28 and 29 demonstrate embodiments of a ply-by-ply layup of unitape layers and other structural elements onto a male form tool, including the incorporation of integrated looped strap elements that integrate lacing loads into the shell of the upper. This strap element for the lacing provides a strong loop that introduces the load distribution from the lace uniformly and reliably into the thin, lightweight upper, and enables optimum engineering of load paths within the shoe to channel and direct loads to optimize load transmission from wearer to individual intended purpose of that individual shoe application and design.

In various embodiments, such as shown in FIGS. 28 and 29, the upper is continuous around the bottom of the upper, and the load paths from both sides of the shoe are integrated into the upper shell. This load path continuity capability is unique, and potentially enables structural decoupling of the upper from the lower, eliminating the need for the lower to carry primary structural loads. This load path continuity capability potentially allows optimization of shock absorption and load distribution while enabling more effective load path design optimization and load management in the upper. It also allows viscoelastic layers to be incorporated between the high strength and low stretch structural connections, and allows shoe structure of the upper to manage shock, dampen impact when running or other activities, and to potentially rigidize the shoe structure under sharp transient impact events such the kicking of a ball whereby there are brief, transient shoe/ball impact events. The ability to rigidize the shoe under kicking impacts potentially improves the kicker's kicking performance while still allowing the shoe to be optimally compliant for running and cutting directions, and while maintaining comfort. This brief rigidizing of the shoe structure during the transient kicking impact loads potentially enhances and optimizes load transmission from the kicker's foot to the ball to translate more of the kicker's muscle effort into imparting more momentum and transmitting more power to the ball when kicked to permit the kicker to kick the ball faster and farther. The rigidizing of the shoe also makes it more stable so kicking accuracy is potentially improved over a shoe that must fit looser to maintain compliance and the necessary comfort levels.

In either the male-tool curing procedures of FIG. 20 or female-tool curing procedures of FIG. 19, mold-tool embodiments may utilize elastomeric mold boxes/split molds comprising elastomeric internal and/or external mold surfaces. In either procedure, mold tools may additionally utilize injection co-molding to produce inner and/or outer component features, as diagrammatically indicated in FIG. 21.

The injection co-molding my be used to infuse or inject resin into dry fiber or partially impregnated materials or preforms, or alternately to creates a hybrid of and injectable thermoplastic or thermoset to form an alloyed hybrid resin or adhesive system.

Figure 21:
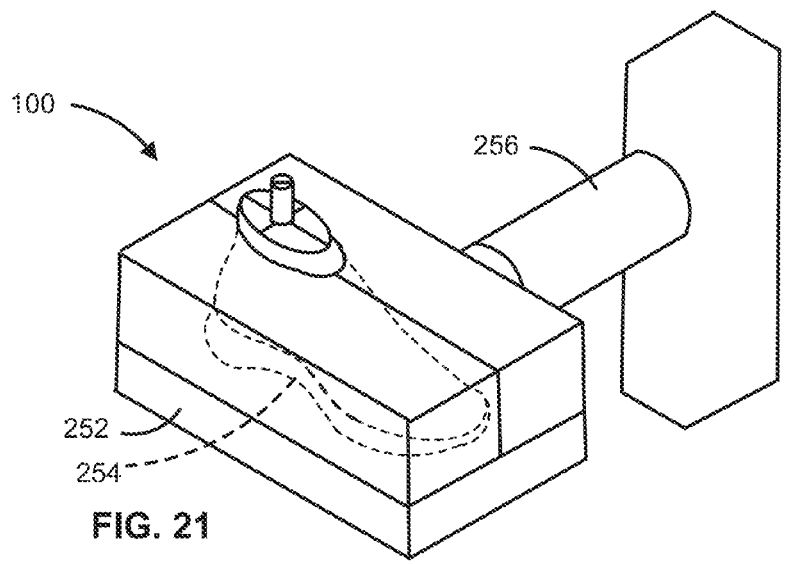
FIG. 21 shows a diagram generally illustrating one exemplary method of applying finish componentry to the composite footwear upper of FIG. 11, in accordance with various embodiments of the present disclosure.

Resin injection may also be used to reproduce inner and/or transfer outer component features, textures or surface finishes built into the inner and outer mold surfaces, such as embossed patterns, shapes, and to incorporate in the surface of the tools or surface layers, as diagrammatically indicated in FIG. 21.

Internal and external mold surfaces may also incorporate molded, etched or machined-in patterns, textures, negative or positive impressions, or pockets to provide patterns, shapes, geometric features, embossed simulated leather or cloth textures, grooves, perforations, graphics, simulated stitching or seams, graphics, logos, glossy or matte surface finishes. The surface can be formed using various methods such as spray, brushed or dipped surface resin, directly applied to the patterned mold surface, a compliant or formed surface film heat or vacuum formed to the surface of the tool, or the mold pattern may be transferred directly from the surface of the mold to the and impressionable surface finish applied to the upper specifically designed to accept and transfer the patterns on the mold.

Inserts such as heel counters, stiffeners and midsoles can be directly molded in during the one shot process using preformed thermoplastics, thermoplastic matrix carbon fiber or fiberglass reinforced preformed or pre fabricated details or the can be co cured to the upper using a compatible thermoset matrix.

Features such as toe bumpers, heel counters, appliques, articles or pads for kicking balls or abrasion protectors, may be placed in pockets or impression that form the negative of the component to locate and bond the component to the upper during the molding step of the upper as a one shot or secondary process. Features such as toe bumpers, can be fully or partially cured elastomers or molded thermoplastics. Bonding can be via methods discussed herein or via co-curing in the case of the partially cured elastomer. The adhesive matrix of the upper or the surface coating may alternatively used to bond the detail components if appropriate These surface details may also be bonded after the molding step using similar techniques used for current shoe production FIG. 21 shows a diagram, generally illustrating one method of applying finish componentry to composite footwear upper 102 of FIG. 11. FIG. 21 generally depicts what may be described as "one shot" inclusive molding. In this procedure, external features (e.g., sole components 254, molded counters, etc.) are applied within a closed-mold tool during curing step 210. Such "one shot" inclusive molding may utilize modified injection molding processes, as shown. In an exemplary arrangement of the system, the female tool 252 is modified to comprise one or more polymer injection molding components 256, as shown. In various embodiments, one or more elastomeric polymers are injected within the mold tool to form, for example, a resilient sole component. The curing process forms a permanent connection between composite footwear upper 102 and the injected component. Injection timing and polymer chemistries can be chosen to maximize compatibility with the curing cycle of the composite materials forming the upper component. Various elastomeric materials are selected based on required mechanical performance, molding process, cost, and the like. Various injected materials include, but are not limited to, ethylene vinyl acetate (EVA), foamed polyurethanes, flexible polyvinylchlorides, viscoelastomeric materials, and the like.

Figure 22:
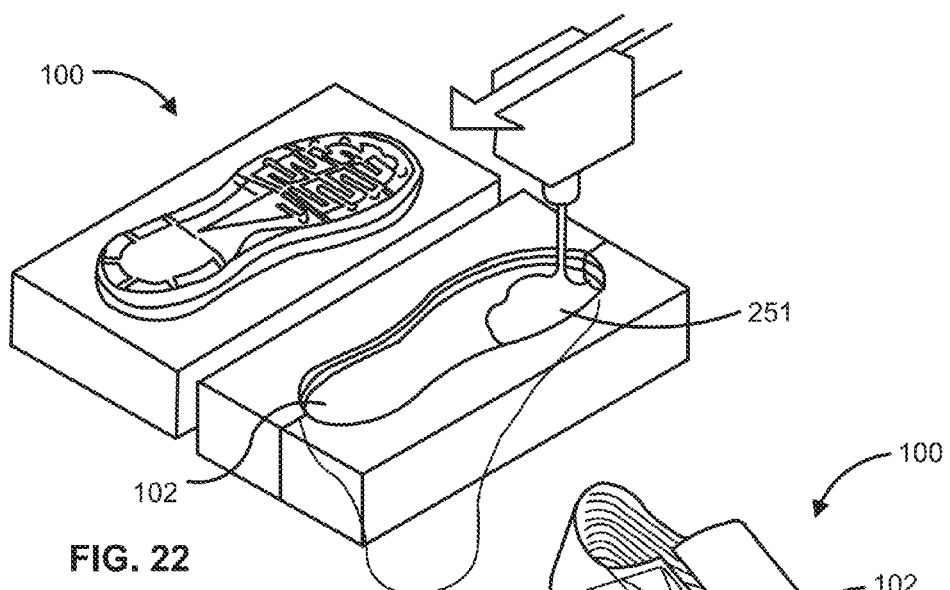
FIG. 22 shows a diagram generally illustrating an alternate exemplary method of applying finish componentry to the composite footwear upper of FIG. 11 in accordance with various embodiments of the present disclosure.

FIG. 22 shows a diagram, generally illustrating an embodiment of a method of applying finish componentry to the composite footwear upper of FIG. 11. In this exemplary method, one or more elastomeric materials 251 are introduced into an open multi-part mold containing either pre-cured or uncured composite footwear upper 102. The mold parts of the multi-part mold are then assembled to form a substantially enclosed negative-impression cavity having an internal shape corresponding to the features of the sole component. The exemplified process can form a permanent connection between composite footwear upper 102 and the molded component.

Figure 23:
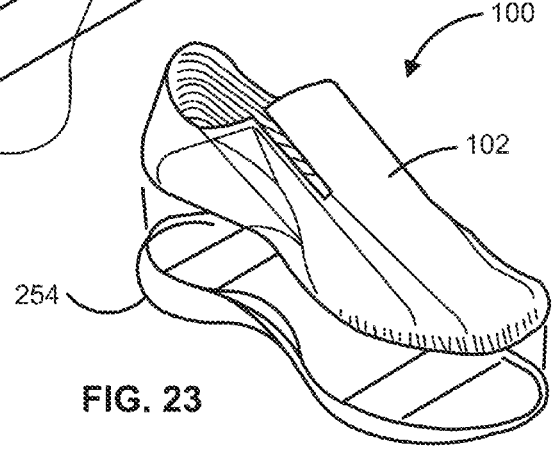
FIG. 23 shows a diagram generally illustrating an alternate exemplary method of applying finish componentry to the composite footwear upper of FIG. 11 in accordance with various embodiments of the present disclosure.

FIG. 23 shows a diagram, generally illustrating an alternate method of applying finish componentry to the composite footwear upper of FIG. 11. In this alternate method, a preformed sole is bonded or otherwise permanently affixed to cured composite footwear upper 102.

Various three-dimensional one-piece parts in accordance with the present disclosure are relatively inexpensive because the of the low specific cost per unit performance of the high performance fibers uses, inexpensive conversion of low cost, readily available high denier tow to thin, light weight unitapes, and the potential ability to automate fabrication and production of the upper, the use of a "One Shot Mold System" to produce the finished upper. Cost can also be reduced if the upper is bonded to the lower as a one shot process. Better shape fidelity (primarily due to precision tolerance 3D molding), enable efficient down stream production and automation of the rest of the manufacturing steps and comprise better pressure integrity, comprise better integration of structural details (strapping, attachment points, etc.), comprise no seams to fail or cause leakage, and comprise uniform strain, amongst other advantages.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

Likewise, numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size and arrangement of parts including combinations within the principles of the disclosure, to the full extent indicated by the broad, general meaning of the terms in which the appended claims are expressed. To the extent that these various modifications do not depart from the spirit and scope of the appended claims, they are intended to be encompassed therein.

What is claimed is:

1. A method of producing a cured part, said method comprising the steps of:
   providing a male tool having a three-dimensional shape;
   creating a fiber-reinforced, uncured scrim by sticking together two unitape layers, each unitape layer comprising a single fiber-reinforced direction provided by monofilaments spread side-by-side and embedded in an elastic polymer adhesive resin, the two unitape layers having an intersecting relative orientation in the scrim whereby one unitape layer has a different fiber direction than the other unitape layer, and the elastic polymer allowing the uncured scrim to stretch in non-fiber reinforced bias directions not aligned with the fiber directions;
   stretching said fiber-reinforced uncured scrim in said bias directions over the male tool; and
   curing the uncured, stretched scrim on the male tool to form the cured part in the three-dimensional shape of the mold,
   wherein the single direction monofilament alignment within each unitape layer is stabilized and maintained during the stretching of the fiber-reinforced uncured scrim by reinforcement provided by the intersecting unitape layers.

2. The method of claim 1, further comprising placing additional unitape layers over said scrim or over said male tool prior to said curing.

3. The method of claim 1, further comprising coating a release material over the male tool followed by one or more adhesive sizing materials to hold the stretched scrim adjacent to the male tool.

4. The method of claim 1, wherein said curing comprises use of at least one of a vacuum bag, an elastomeric external bladder, or a mold box.

5. The method of claim 1, wherein said cured part is configured to be integrated into a shoe.

6. The method of claim 1, wherein said male tool further comprises a vacuum port to allow for vacuum-assisted layup of said scrim during said stretching.

7. The method of claim 1, further comprising placing a surface layer over said scrim or the male tool prior to said curing.

8. The method of claim 7, wherein said surface layer comprises a film layer, a breathable membrane, a woven fabric layer, a nonwoven fabric layer, or a leather layer.

9. The method of claim 1, wherein said scrim is a first scrim, and wherein the method further comprises creating at least one additional of said uncured scrim and stretching the at least one additional scrim over said male tool and said first scrim prior to said curing, said cured part being formed from the cured first and at least one additional scrims.

* * * * *